(12) United States Patent
Young

(10) Patent No.: US 6,651,511 B1
(45) Date of Patent: Nov. 25, 2003

(54) METHOD AND APPARATUS USING MAGNUS EFFECT TO MEASURE MASS FLOW RATE

(76) Inventor: Alan M. Young, P.O. Box 427, Redwood Estates, CA (US) 95044

( * ) Notice: Subject to any disclaimer, the term of this patent is extended or adjusted under 35 U.S.C. 154(b) by 269 days.

(21) Appl. No.: 09/784,510

(22) Filed: Feb. 14, 2001

Related U.S. Application Data
(60) Provisional application No. 60/182,654, filed on Feb. 15, 2000.

(51) Int. Cl.[7] .................................................. G01P 5/08
(52) U.S. Cl. ................................................... 73/861.08
(58) Field of Search .................... 73/861.08, 861.77, 73/866.5

(56) References Cited

U.S. PATENT DOCUMENTS

| | | | | |
|---|---|---|---|---|
| 4,072,049 A | * | 2/1978 | Miller | 73/147 |
| 4,635,474 A | * | 1/1987 | Blackwood | 73/170.11 |
| 5,804,740 A | * | 9/1998 | Kalinoski et al. | 73/861.24 |
| 6,058,785 A | * | 5/2000 | Kalinoski et al. | 73/861.24 |

* cited by examiner

*Primary Examiner*—Edward Lefkowitz
*Assistant Examiner*—Corey D. Mack
(74) *Attorney, Agent, or Firm*—Burns, Doane, Swecker & Mathis LLP; Claude A.S. Hamrick

(57) ABSTRACT

Apparatus and method for measuring mass flow rate of fluid materials including a rotationally oscillating probe attached to a support at one of its ends and adapted for extension into a flow stream. The fluid flowing thereabout interacts with the probe to produce an oscillatory Magnus lift force that is distributed along the portion of the probe exposed to the fluid stream and is directed substantially perpendicular to both the direction of fluid flow and to the rotational axis of the probe. The amplitude of the rotational oscillation is related to the fluid's mass flow rate and is determined using motion-responsive sensors. Electronic circuitry and processor means convert electrical signals generated by the sensors to develop an output signal proportional to mass flow rate. The probe assembly can be implemented in various forms including "concentric tuning fork", "linear rotational tuning fork" and "parallel rotational tuning fork" arrangements. In alternative embodiments, additional sensing means integral to the probe assembly allow determination of the fluid's flow velocity (based on vortex shedding), fluid density, and fluid viscosity.

46 Claims, 17 Drawing Sheets

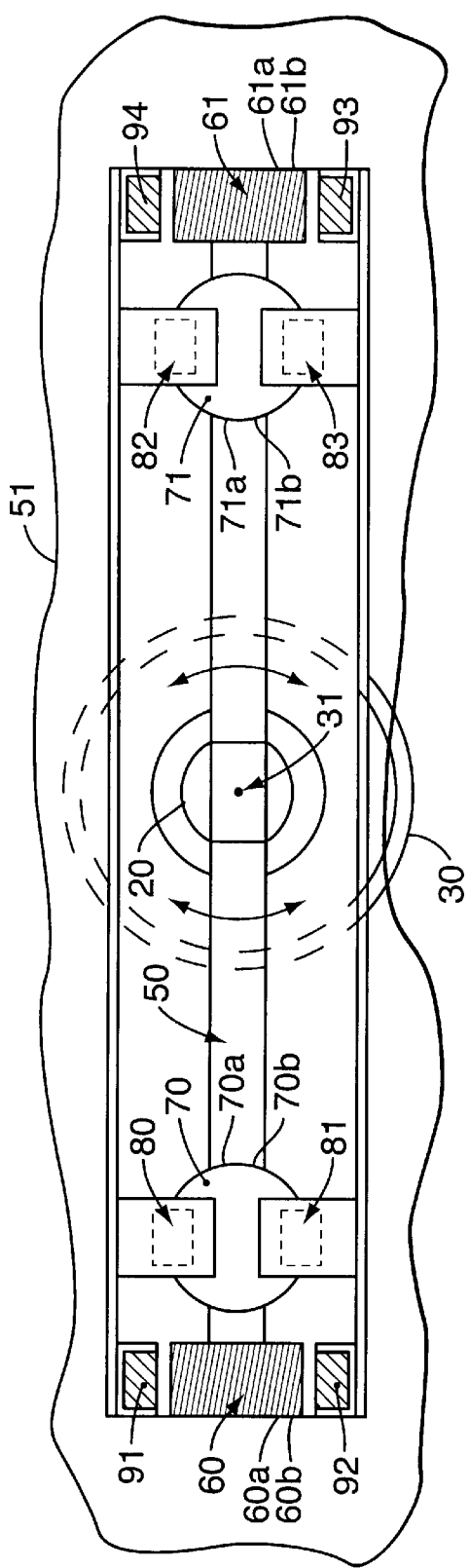
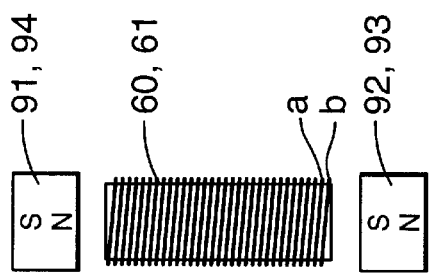
FIG. 9b
FIG. 8
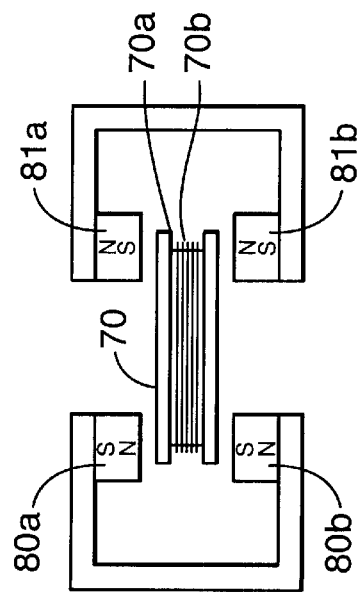
FIG. 9a

Instantaneous displacement, B, due to the Magnus lift force deflecting the FSE relative to the support (and/or "inner axle")

METHOD AND APPARATUS USING MAGNUS EFFECT TO MEASURE MASS FLOW RATE

CROSS REFERENCE TO RELATED APPLICATIONS

Reference is made to and priority claimed from U.S. provisional application Ser. No. 60/182,654, filed Feb. 15, 2000, entitled "A New Method & Apparatus for Determining the Mass Flow Rate of a Fluid Using the Magnus Effect".

FIELD OF THE INVENTION

The present invention relates generally to fluid flow measurement methods and apparatus, and more particularly to a new method and apparatus for measuring the mass flow rate of fluids flowing through closed conduits using the Magnus Effect. In accordance with the invention, an oscillating probe is extended into a flow stream and experiences an oscillating Magnus "lift force" that relates to fluid mass flow rate.

BACKGROUND OF THE INVENTION

Historically, the Magnus Effect and its more rigorous counterpart, the Kutta-Joukowski Theorem ("KJT"), have been used to describe the lift force experienced by a spinning cylinder immersed in a transversely flowing air stream. The KJT mathematically describes the phenomenon of lift resulting from fluid flowing around the object. Using the KJT, one can demonstrate that if an object such as a cylinder (sphere or other shaped object) 10 is placed in an air stream 12, as depicted in FIG. 1, no lift force results. However, rotating the cylinder 10 about its axis 13 as suggested by the arrow 14, and in the flowing stream 12 produces a lift force $F_L$. The lift force experienced by the rotating cylinder is called the "Magnus Effect" in recognition of Heinrich Magnus, a German Physicist, who studied deviations in the trajectories of spinning artillery shells. It is now understood that the Magnus lift force explains why baseballs "curve", tennis balls "cut", and golf balls "hook" or "slice". The KJT describes the lift force $F_L$ acting on a cylinder of length L, radius R, spinning at a rate of S revolutions per unit time about its longitudinal axis 13 as proportional, in part, to the product of fluid density and fluid velocity. According to the KJT, the lift force per unit length, $F_L$, exerted on the spinning cylinder is:

$$F_L = \rho V \Gamma \quad (1)$$

Where $\rho$=air density, V=free stream air velocity, and $\Gamma$=the circulation of fluid around the object defined as the line-integral of the fluid velocity around the spinning cylinder's circumference C:

$$\Gamma = \int_C V_R \, dr = 2\pi R V_R \quad (2)$$

$V_R$ is the fluid velocity at the periphery of the cylinder and, in this particular case, equals the cylinder's peripheral surface velocity because the fluid boundary layer adheres to the cylinder's surface. $V_R = 2\pi RS$, is the velocity of the rotating cylinder at its periphery with S being the rate at which the cylinder spins. The direction of the lift force is perpendicular to both the cylinder's longitudinal axis and the direction of the fluid velocity V as depicted in FIG. 1. The Magnus lift force is distributed along the portion of the cylinder's length exposed to the fluid stream. Equation (1) applies to a surface of any cross-sectional shape regardless of whether the circulation, $\Gamma$, is "mechanically induced" (as with rotating a cylinder), "natural" (as with an airfoil), or a combination thereof.

Classically, the Magnus Effect applies only to mechanically induced circulation of fluid around an object (but not necessarily cylindrical in shape). Mechanically induced circulation causes the boundary layer adhering to the cylinder's surface to interact with the flowing stream resulting in a momentum transfer from the free-stream flow, across the boundary layer, to the cylinder. This momentum transfer causes the rotating object to experience a lift force directly proportional to the momentum of the fluid stream. The mass flow rate, $Q_M$, of a fluid of density, $\rho$, flowing with average velocity, V, through a conduit of cross sectional area, $A_c$, is:

$$Q_M = \rho V A_c \quad (3)$$

The ability to measure a fluid's rate of mass flow using the Magnus Effect is based partially on the fact that, the magnitude of the Magnus lift force, like the fluid mass flow rate, $Q_M$, is proportional to $\rho V$.

Others in the field have recognized the potential applicability of this technique to the measurement of mass flow rate. For example, in the Japanese Application Number JP1990000128718 of OGAWA YUTAKA and KAWAOTO HIROSHI with Issued/Filed Dates of Jan. 27, 1992/May 17, 1990, the applicants disclose that they believe they can measure mass flow rate by using a strain gage to determine the Magnus dynamic lift on a cylinder rotating at constant speed in a viscous fluid. The Magnus dynamic "lift" is measured as a function of the change of the strain of strain gages, and the change in the strain quantity is converted to an electrical signal by a bridge circuit to provide a value proportional to the geometric product of the flow velocity and the density. This information is then used to determine mass flow rate.

In a second Japanese Application Number JP1992000101875, bearing Issued/Filed Dates of Oct. 22, 1993/Mar. 29, 1992, to INA YOSHITAKA, NAKAO SHINICHI and HAYAKAWA MASAO, the mass flow rate of a gas flow running at a fixed velocity V through a passage is measured by a rotary cylinder disposed in the gas passage and rotated at a fixed peripheral velocity. Pressures P1 and P2 generated on opposite sides of the outer periphery of the rotary cylinder by this rotation are supplied to a differential pressure detector and the differential pressure between the sensors is determined. Based on this differential pressure, the mass flow rate $Q_m$ is determined using the relationship of $P = 2Q_m(v/A)$.

Both of these references require that rotation of the cylinder be kept constant; that is, they require rotating a drive motor at constant rotating speed. The second reference also requires that pressures P1 and P2 generated in the vicinity of the "upper and lower places" of the outer periphery of the rotary cylinder be measured to determine mass flow rate. These approaches have certain disadvantages. For example, the need to rotate the cylinder at constant speed requires closed-loop feedback and control of motor speed, which adds expense. Not having adequate motor speed control is a serious limitation, in that any variation in motor speed will directly result in a mass flow measurement error.

Another disadvantage is that these approaches require sealing of the "cylinder", or its connecting shaft, from the fluid, and from the cylinder's drive motor and the "outside world". This type of construction imposes multiple problems that affect performance, reliability, and usage/application. Sliding seals or gaskets exhibit a pressure sensitivity that can exert forces on the probe, which can compete with the Magnus force, thereby producing mass flow measurement errors. This is especially important in that many industrial applications experience flow pulsation due to fans, compressors, and pumps. Sliding seals can also present fluid compatibility problems with highly corrosive fluids, and/or safety problems related to the reliable sealing or escapement of toxic or volatile fluids. Also, seals require maintenance, and impose pressure-rating limitations. Sliding seals also exert friction on motor parts that can influence motor speed control. Because seals must by their nature be compliant, they necessarily "absorb" some of the cylinder's Magnus force deflection and thereby further limit the ability of the apparatus to measure lower mass flow rates accurately, particularly in the case of gases.

A further disadvantage is that strain gauges have limited usefulness because they must be bonded securely and permanently to the cylinder shaft. The integrity of the bond can degrade with temperature, thereby restricting the useful operating temperature range. Moreover, pulsations and vibrations coupling into the cylinder from the pipe and fluid can introduce periodic and random signals into the strain gauges that can be misinterpreted as being "real" and related to mass flow.

Still another problem associated with the Japanese inventors' approaches is that they require pressure sensing. This can restrict the useful measurement range at low differential pressures. It also adds cost and more complexity to the device. Pressure sensing will have difficulty with pressure pulsations creating large common-mode pressures that can restrict application and usefulness of the device as well as contribute to further mass flow measurement errors. Contaminants in the fluid can also contaminate the pressure lines leading to erroneous readings. Furthermore, measuring differential pressures nearby the cylinder does not have a unique relationship to Magnus Effect. Any factors that influence the differential pressure distribution in proximity to the cylinder can adversely affect the relationship of the differential pressure to the Magnus force and hence affect measurement accuracy.

Other mass flow measurement techniques involving what might on first impression appear to involve similar or perhaps related functionality, have found favor during the last decade. One such class of devices is that known as Coriolis mass flow metrology. However, on closer inspection, it is clear that the fundamental operating principle known as the "Magnus Effect" (and the related Kutta-Joukowski Transformation) is totally different from the "Coriolis Effect" implemented in Coriolis flow meters, and has not heretofore been successfully implemented as an accepted mass flow measurement technique. The physical phenomena associated with the "Magnus Effect", and that of the "Coriolis Effect" are not related or connected in any manner. The Magnus Effect is a special case of the more general Kutta-Joukowski Transformation, which represents one the fundamental principles of aerodynamic lift, and one to which the Coriolis Effect bears no relationship. Fundamentally, Coriolis mass flow meters require that fluid flow through at least one conduit that is caused to vibrate transversely relative to the direction of fluid flow. By contrast, in using the Magnus Effect to measure flow rate, fluid does not flow through a vibrating conduit. Instead, fluid flows outside of and around a rotating probe. Furthermore, the probe of the Magnus Effect device is clearly not a conduit, as fluid contacts only the probe's outer surface. The "Magnus Effect" describes and explains the force experienced by an object placed in a flowing fluid stream which, when the object is rotated, results in the application thereto of a "lift" force that is transverse in direction to both the flowstream and the axis of rotation of the object. The operating principles of the prior art Magnus effect devices thus clearly bear no relationship to the "Coriolis Effect", or to Coriolis mass flow meters in general. But just as the Coriolis Effect has met with success in the field of flow measurement, it is believed that the Magnus Effect can likewise find useful application. However, as pointed out above, previous attempts at using the principles of the Magnus Effect to measure mass flow rate have not met with great success. There is thus a need for the development of a fundamentally different and distinctive way to measure mass flow rate using the Magnus Effect in a new and unique manner.

SUMMARY OF THE INVENTION

It is therefore a primary objective of the present invention to provide new, improved means to directly measure the true mass flow rate of a fluid independent of the fluid's physical or chemical properties;

Another objective of this present invention is to provide a means for measuring the true mass flow rate of a gas without having to measure density (or other properties such as temperature and pressure to calculate density) in order to determine mass flow rate by combining density with flow velocity or volumetric flow rate;

Still another objective of the present invention is to provide a means for avoiding the additional substantial cost, complexity, and errors associated with inferring mass flow rate from multi-variable measurement methods; and Yet another objective of the present invention is to provide a means to measure a fluid's mass flow rate, flow velocity, fluid density, and viscosity using only one common sensing element. In contrast with Coriolis mass flow meters, Further objectives of this new technology are:

(1) to provide improved means to measure mass flow rate without directing the fluid through a vibrating tube offering improved safety;

(2) to provide an insertion-style design to permit smaller physical size, reduced complexity, and simpler construction to allow substantial reduction in manufacturing cost and installation expense for application on pipes larger than about 3–6 inches (75 to 150 mm) in diameter; and (3) to provide improved means to measure the true mass flow rate without using "by-pass" tubes as used in thermal mass flow meters.

Another objective of the present invention is to provide improved means to measure fluid mass flow rate without using a continuously spinning cylinder which requires a constant speed motor and flexible seals; factors that contribute flow measurement errors and limit performance and usage.

In contrast to the "classical" Magnus Effect described above, a preferred embodiment of the present invention employs a rotationally oscillating probe attached to a support at one of its ends and adapted for extension into a flow stream. The flowing fluid (liquid or gas) interacts with the probe to produce an oscillatory Magnus lift force distributed along the portion of the probe exposed to the fluid stream. The Magnus lift force is directed substantially perpendicular to the direction of fluid flow and to the axis of the probe. The amplitude of the rotational oscillation can be on the order of several degrees. The fluid mass flow rate relates to the magnitude of the resulting oscillatory force (and circulation Γ) according to the above equations (1) and (3). The probe has static and dynamic properties analogous to those of a cantilevered beam by virtue of its construction and mounting. The oscillatory force causes the probe to experience an oscillating moment and exhibit dynamic motion (and deflection) related to the fluid's mass flow rate. Mass flow rate is determined by using known motion-responsive sensor means (contained within the probe) to measure the effects of the oscillating force by, measuring dynamic response characteristics of the probe that relate to (or are proportional to) the magnitude of the force. Electronic circuitry and processor means convert electrical signal(s) from the sensor(s) to a usable mass flow rate value and an electronic output signal proportional to mass flow rate.

Alternative embodiments of the invention employ a probe assembly in various "tuning fork" type arrangements. One such embodiment employs a probe assembly comprising a "concentric tuning fork" including two elongated structures, one disposed within the other in a coaxial manner (e.g., concentric cylinders) and mounted to a common support. The "wetted" exterior surface of the "outer" structure comprises the "flow sensitive element" (referred to as the "FSE") and the "inner" structure functions, in part, as a dynamic counter-balance and can provide a reference for measuring the relative dynamic response characteristics of the "outer" structure. Electromagnetic actuator means cause the concentric, coaxial components to twist and oscillate relative to one another in opposing rotational directions about a common longitudinal axis in a manner similar to that of a "rotational tuning fork" thereby imparting rotational (torsional) oscillation to the probe. This "concentric rotational tuning-fork" configuration allows for vibration cancellation, enhances the "Q" of the vibrating assembly, and minimizes the electrical power needed to sustain oscillation.

In another alternative embodiment of the invention, a "linear rotational tuning fork" is formed by two elongated structure disposed to extend opposite one another in "mirror image" fashion along a common longitudinal axis. One structure comprises the FSE and is intended for insertion into the fluid stream. The opposing structure (intended to be located external to the fluid stream) acts as a dynamic counter-balance and provides a reference for measuring the relative dynamic response characteristics of the FSE. Rotational oscillation is imparted to the FSE and the counter-balance by way of a pair of "connecting rods" through which the applied rotational excitation is applied. Excitation is provided by actuator means that cause the FSE and counter-balance structures to twist and oscillate relative to one another in opposing rotational directions about their common longitudinal axis as a "linear rotational tuning fork". This "linear rotational tuning-fork" configuration allows for vibration cancellation, enhances the "Q" of the vibrating structure, and minimizes electrical power needed to sustain oscillation.

In another alternative embodiment, an additional sensing means integral to the probe assembly allows determination of the fluid's flow velocity (based on vortex shedding) independent of mass flow rate and allows determination of fluid density by dividing measured mass flow rate by flow velocity.

Yet another embodiment of the present invention allows determination of fluid viscosity in addition to mass flow rate by monitoring the power required to sustain the rotational excitation at a desired angular amplitude level or rotational velocity.

These and other objectives and advantages of the present invention will become apparent to those skilled in the art after having read the following detailed description of the various embodiments illustrated and included in the following several figures of the drawing.

IN THE DRAWING

FIG. 1 schematically depicts the Magnus Effect associated with a rotating cylinder placed in an air stream and illustrates a theoretical principle underlying the present invention;

FIG. 2a schematically depicts a rotationally oscillating flow sensitive element attached to a support and inserted into a flow stream with resulting oscillating Magnus lift force causing the element to flex relative to the support to illustrate a theoretical principle underlying the present invention;

FIG. 2b schematically illustrates a mass flow meter in accordance with the present invention;

FIG. 2c schematically illustrates a mass flow meter having an extended FSE axle in accordance with the present invention;

Figure 6A:
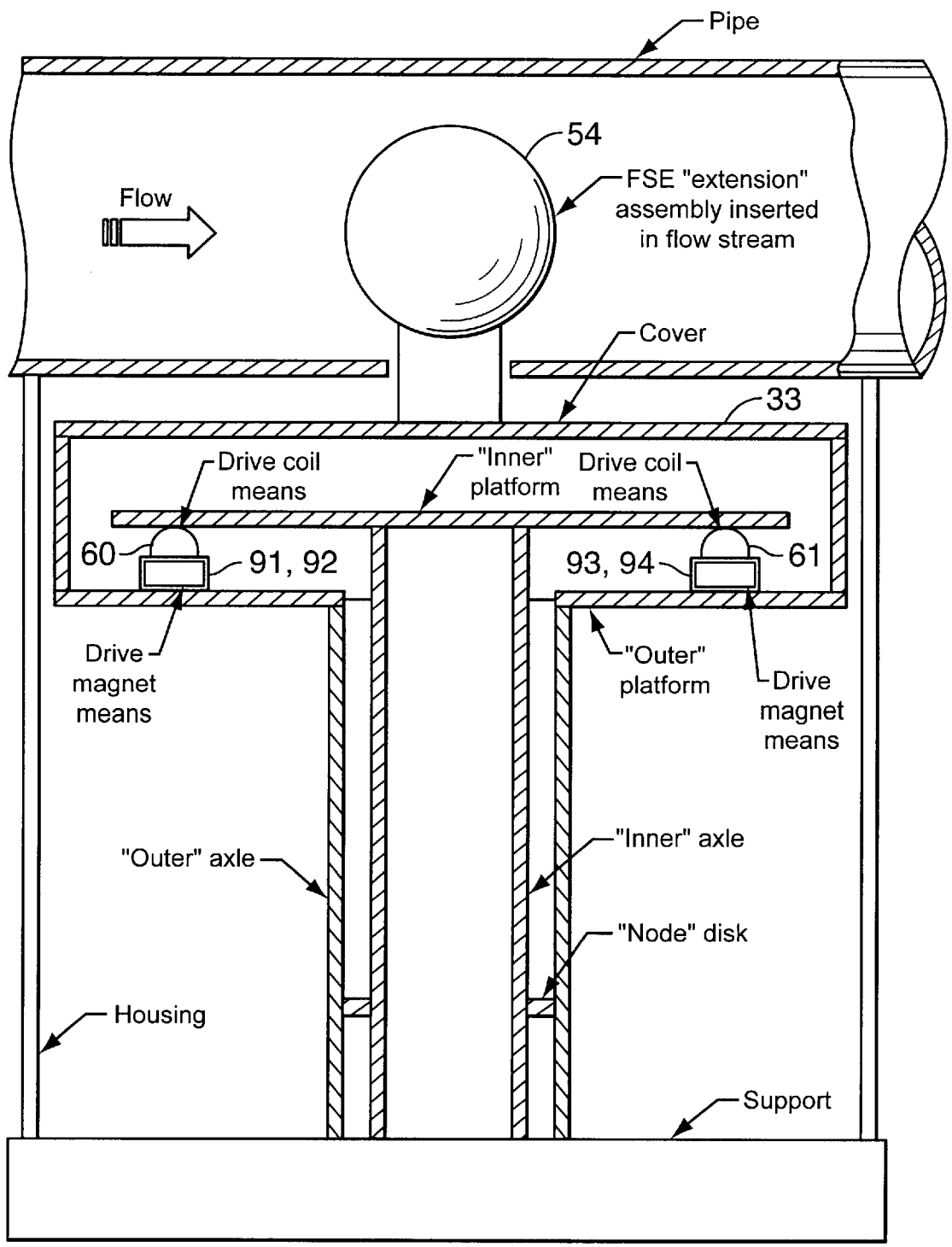
FIG. 6a is a cross-section schematically representing a cylindrical FSE attached to the outer element of a concentric tuning-fork assembly of an alternative embodiment of the present invention.
Figure 6B:
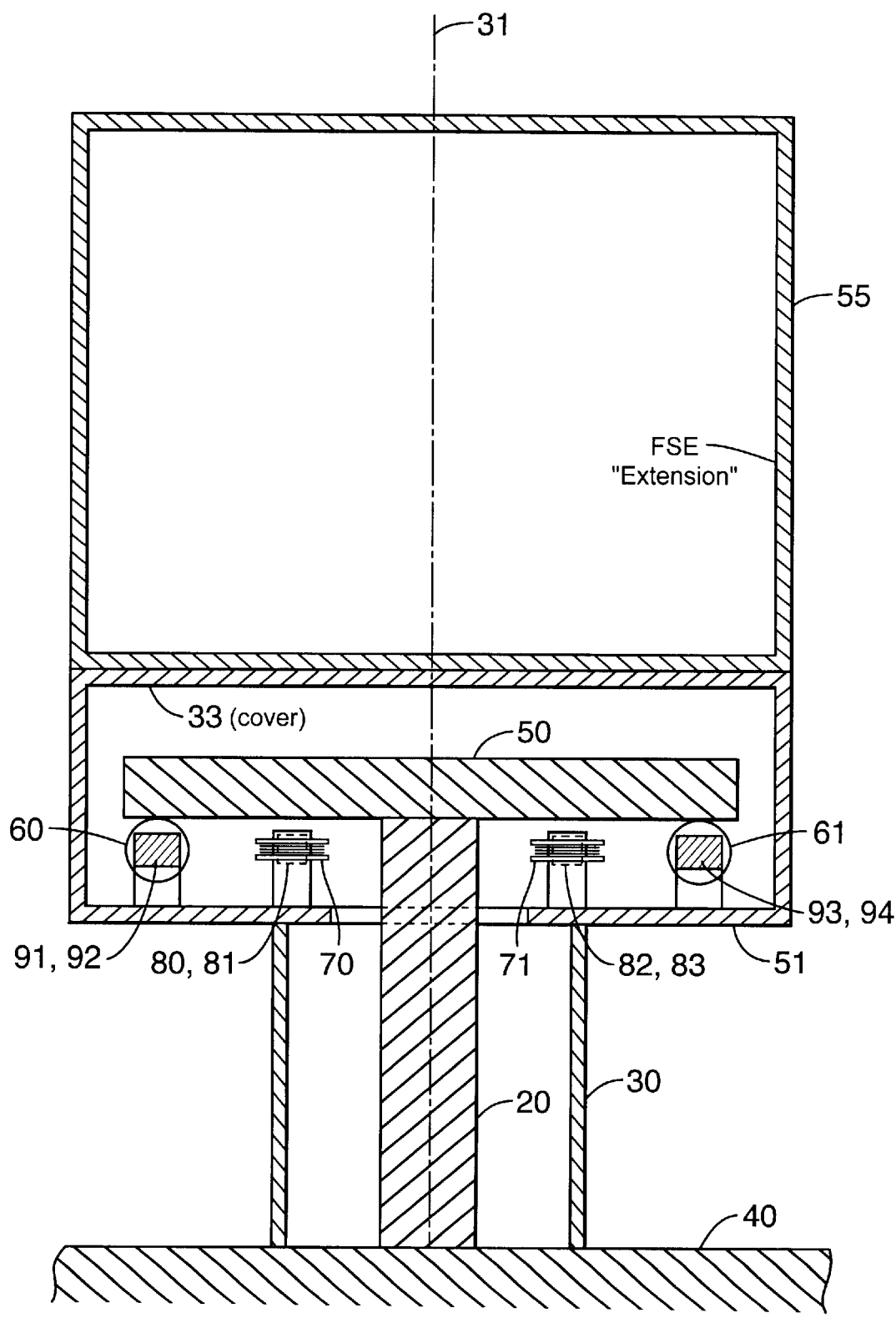
Figure 7:
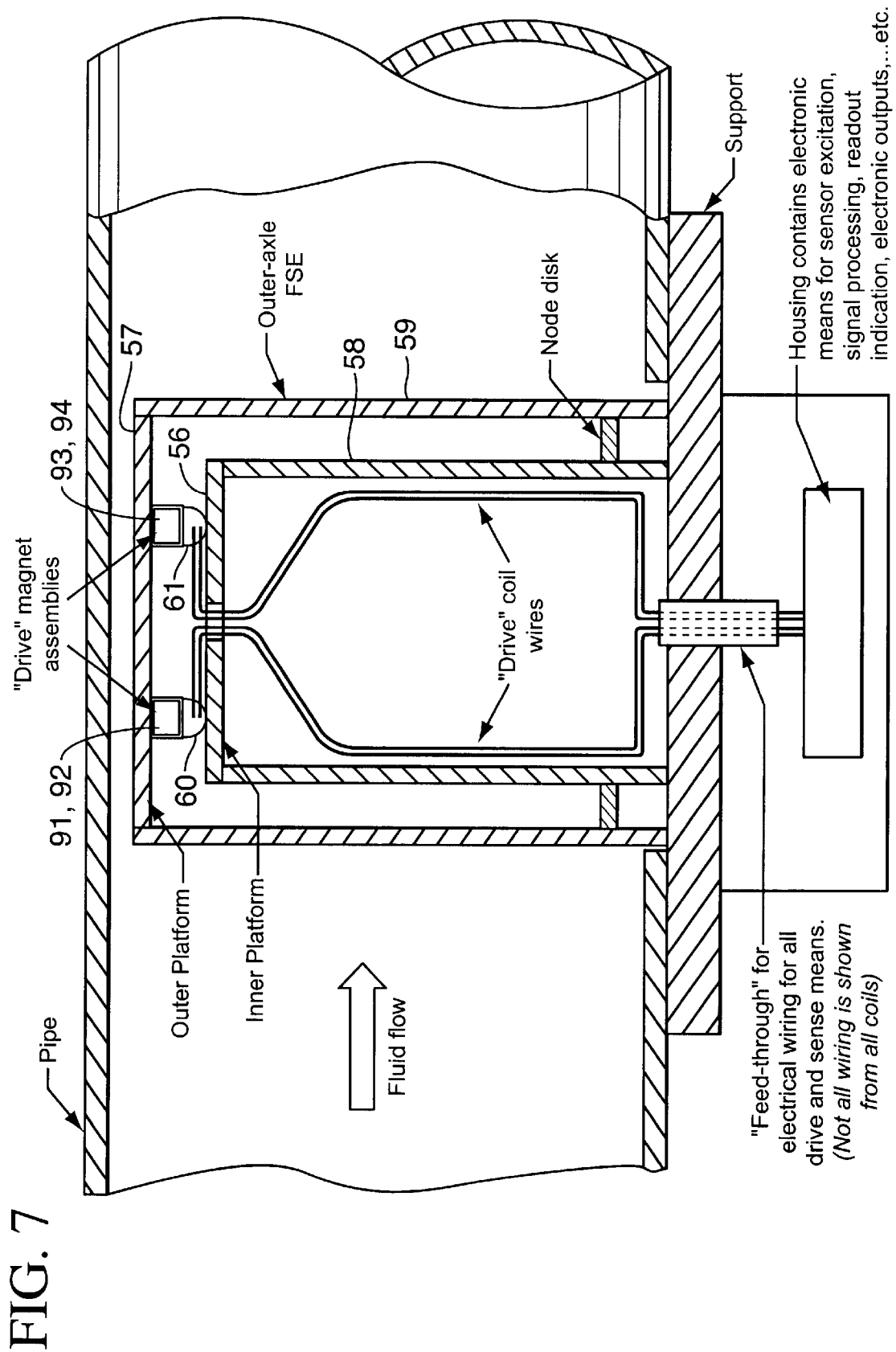
Figure 10:
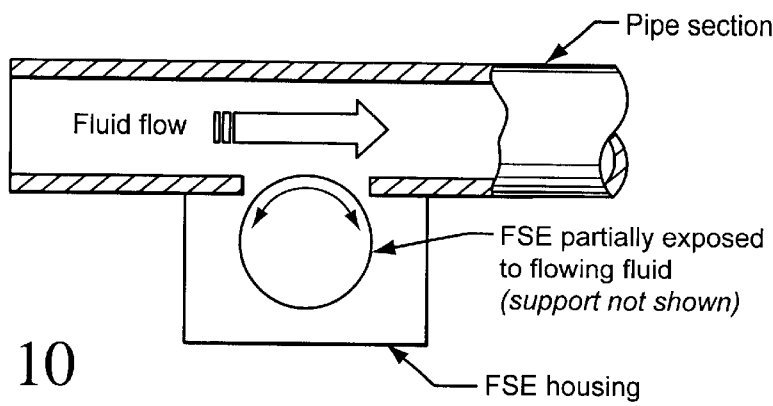
Figure 11A:
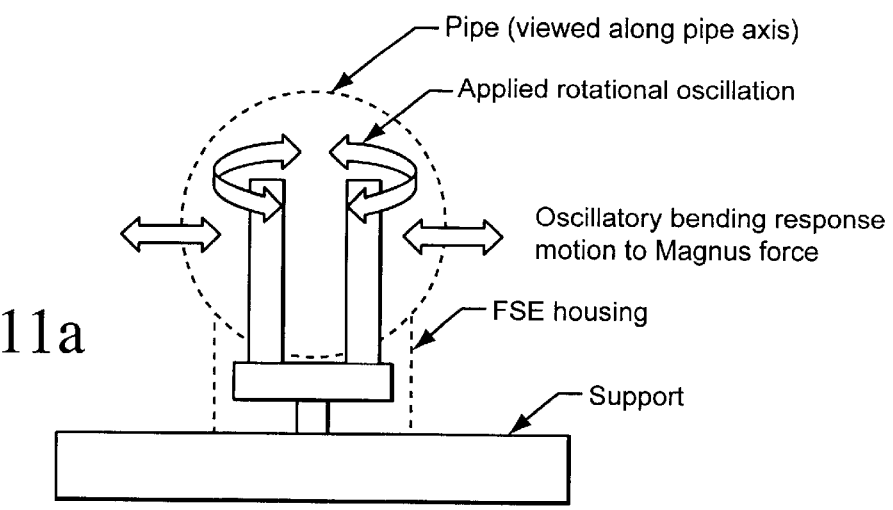
Figure 11B:
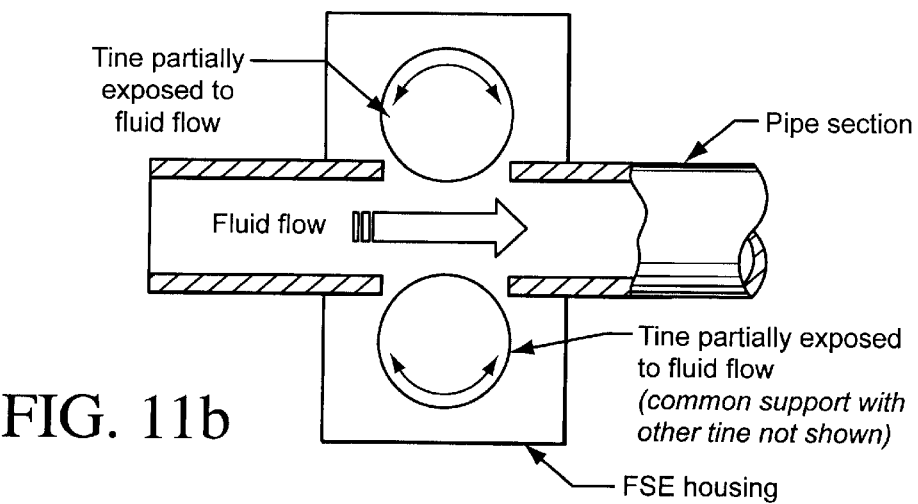
Figure 12A:
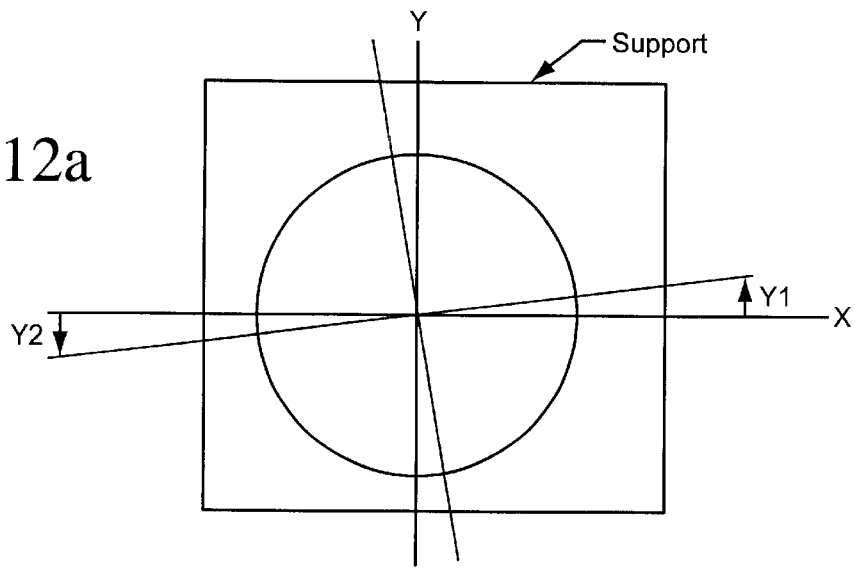
Figure 12B:
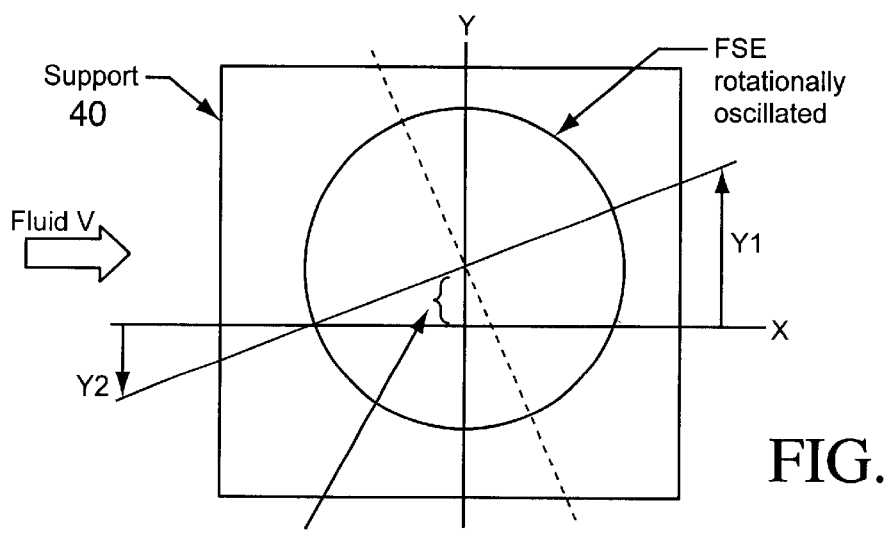
Figure 12C:
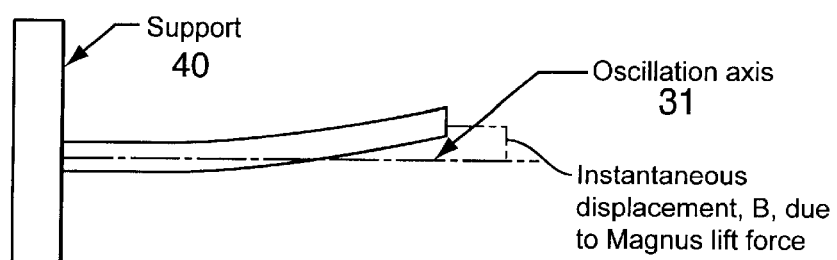
Figure 13:
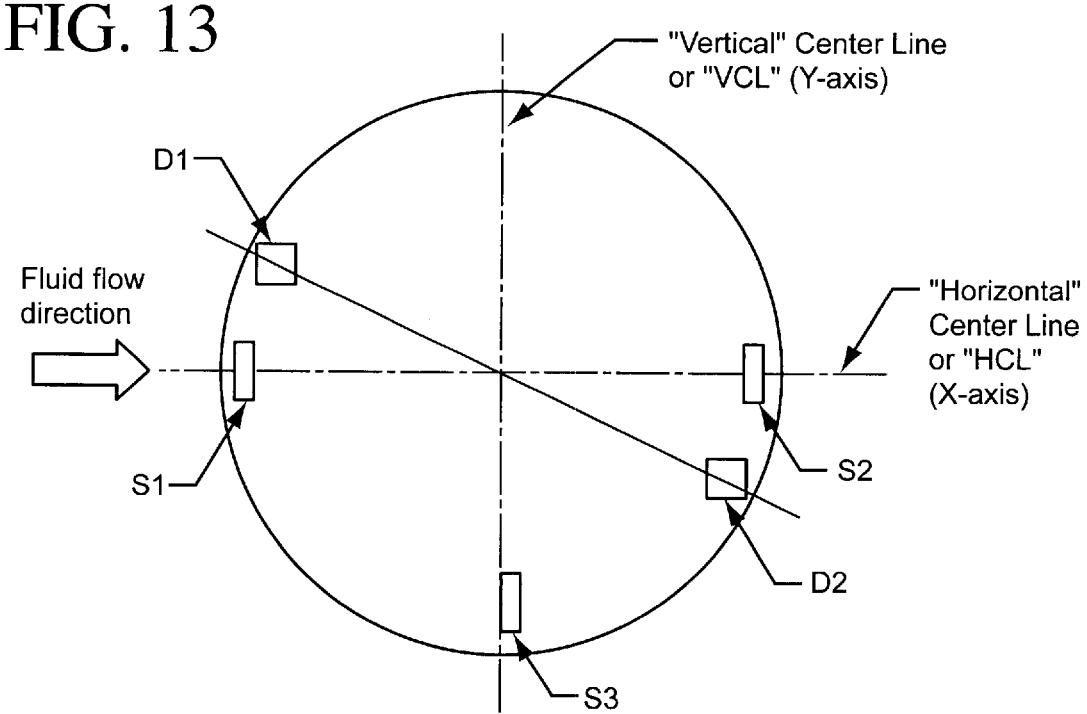
Figure 14:
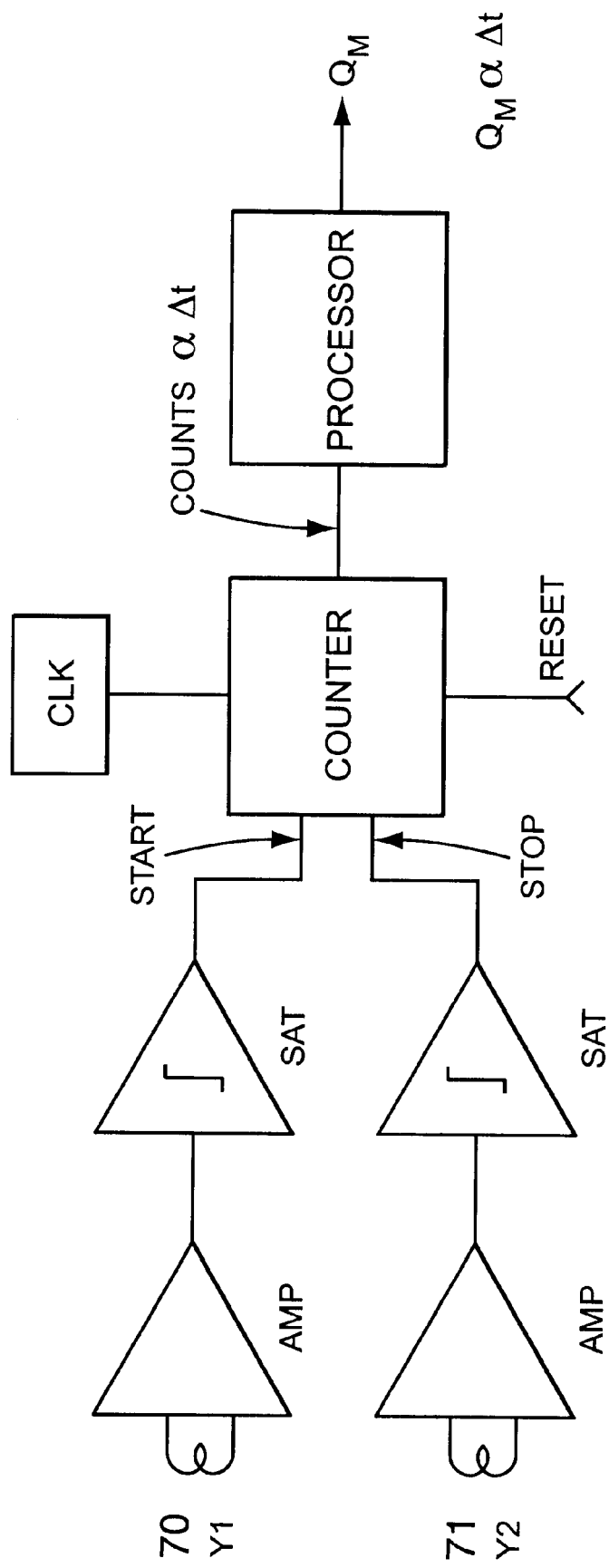
Figure 15:
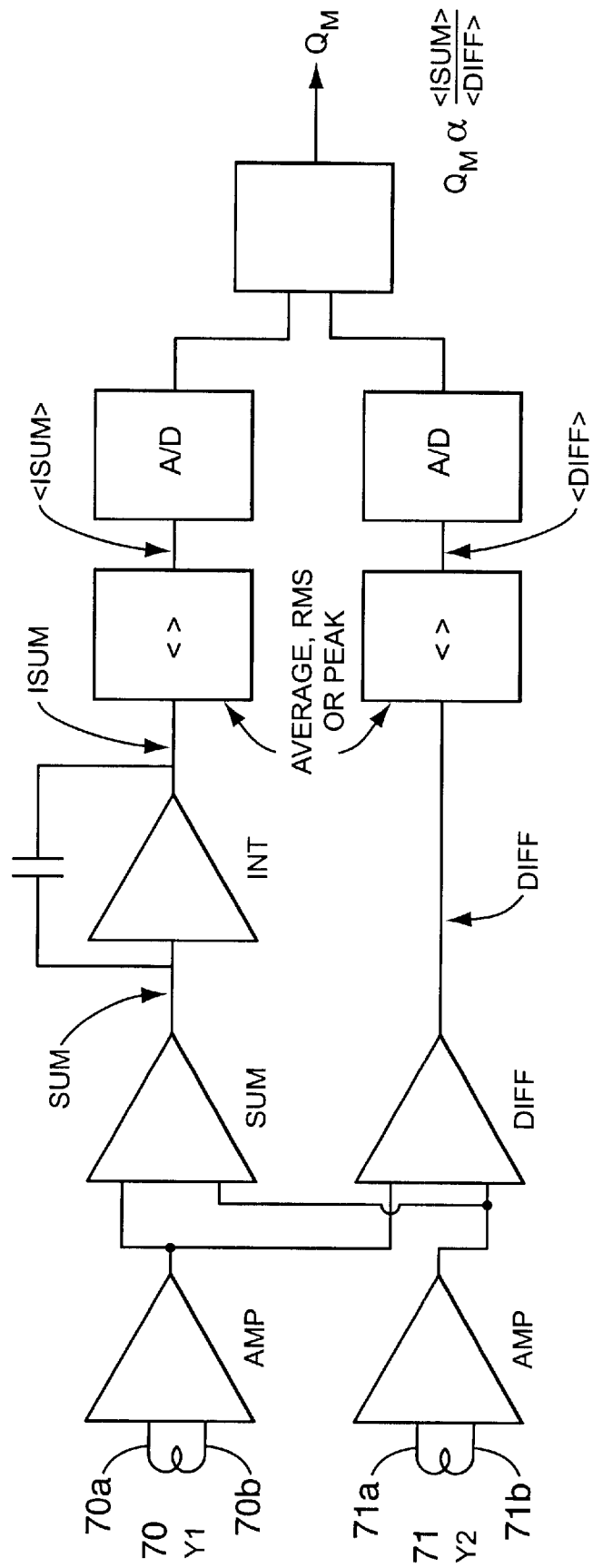

FIG. 6b schematically depicts a cylindrical FSE "extension" to the outer element of another embodiment of the present invention;

FIG. 7 illustrates a concentric tuning fork assembly in accordance with another alternative embodiment of the present invention wherein the entire FSE assembly is inserted into the flow stream;

FIG. 8 schematically depicts a "bottom" view of a cross-member support structure supporting drive actuator and sense coil and magnet assemblies;

FIG. 9a further illustrates the sense magnet-coil assembly of FIG. 8 showing relative polarity of the permanent magnets of the assembly;

FIG. 9b further illustrates the drive magnet-coil assembly of FIG. 8 showing relative polarity of the permanent magnets;

FIG. 10 schematically depicts an alternative embodiment of an FSE assembly that is only partially wetted or exposed to a fluid stream;

FIG. 11a is a sectional view taken transverse to the flow stream and schematically depicting a tuning fork structure with tines thereof projecting into the flow stream and rotationally oscillated;

FIG. 11b schematically depicts an alternative configuration of the embodiment of FIG. 11a with the tines only partially inserted into the flow stream so as to "straddle" the flow stream;

FIG. 12a represents a rotationally oscillating FSE as conceptually viewed from its free end to illustrate the theoretical equations of FSE motion without fluid flow;

FIG. 12b represents the FSE of FIG. 12a to illustrate theoretical equations of motion of the FSE in a "flow condition";

FIG. 12c schematically represents a side-view of the FSE of FIGS. 12a and 12b deflected due to Magnus force;

FIG. 13 illustrates relative placement of rotational oscillation drives and motion responsive sensors for an embodiment of the invention;

FIG. 14 is a schematic block diagram representing a "time difference" or "phase difference" signal-processing method and concept in accordance with the present invention;

FIG. 15 is a schematic block diagram representing a "signal ratio" signal-processing method and concept in accordance with the present invention.

Figure 20:
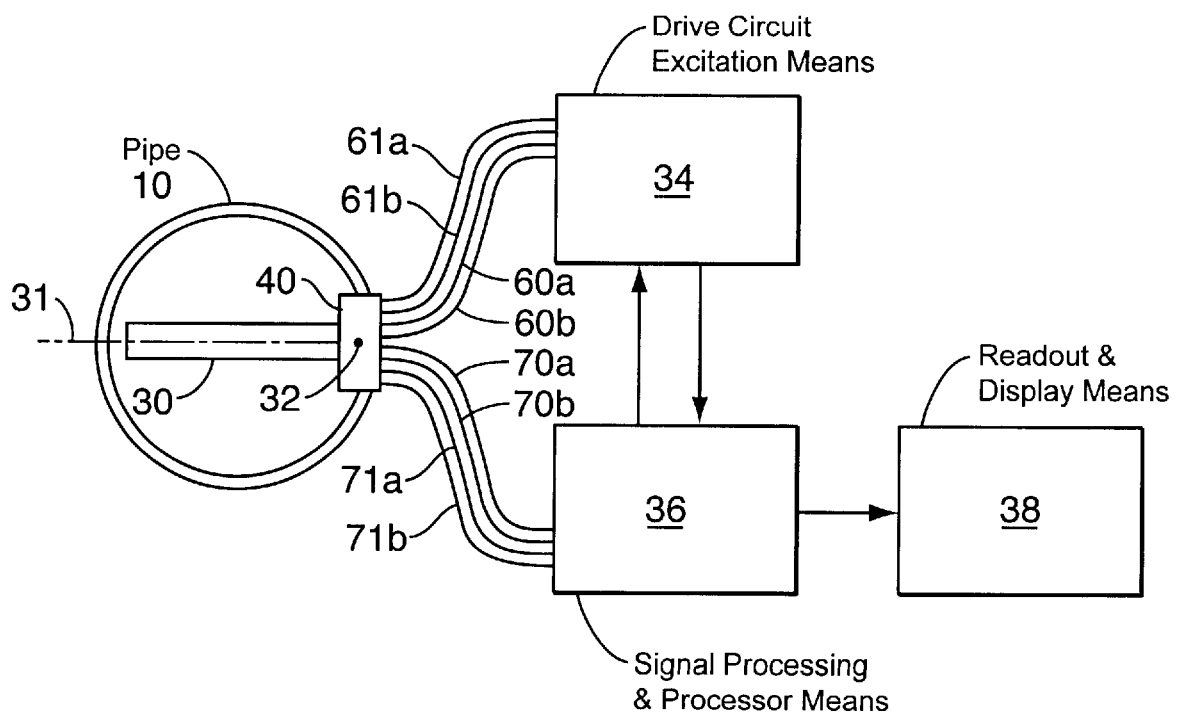
Figure 16:
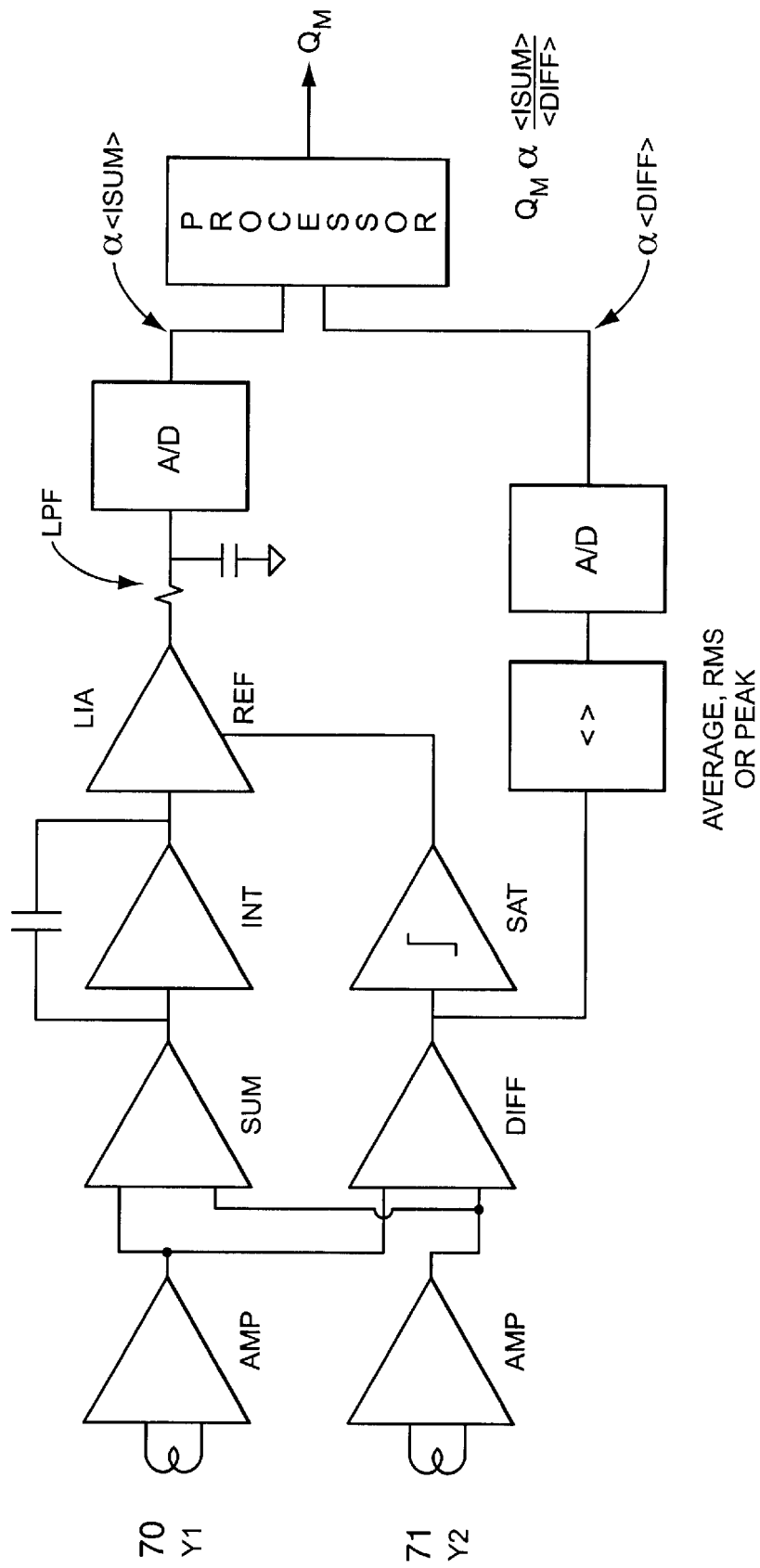
Figure 17:
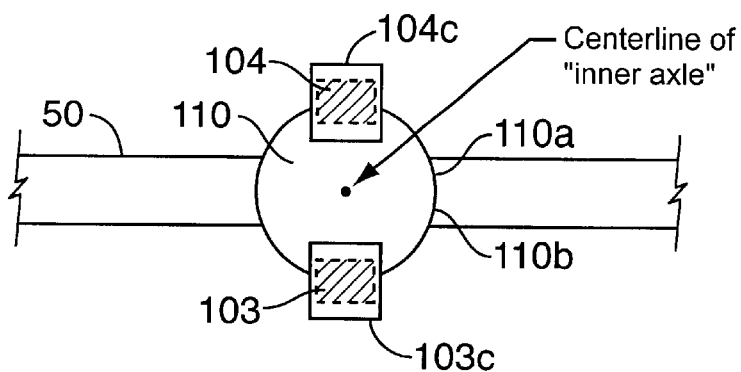
Figure 18:
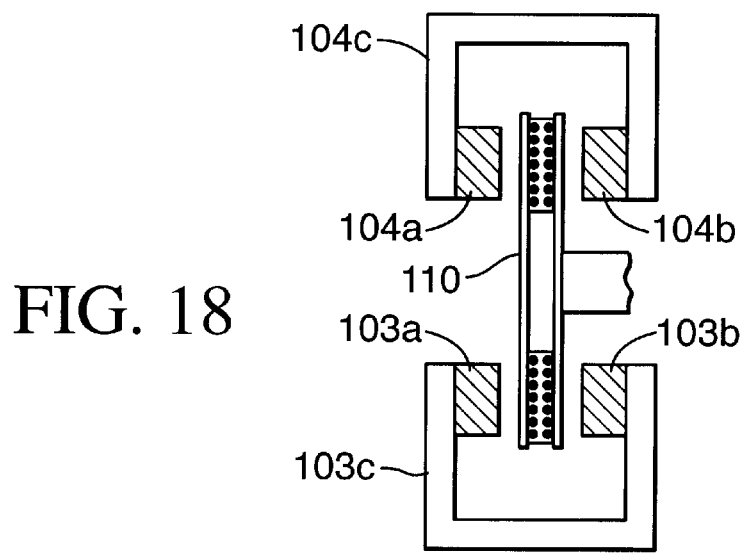
Figure 19:
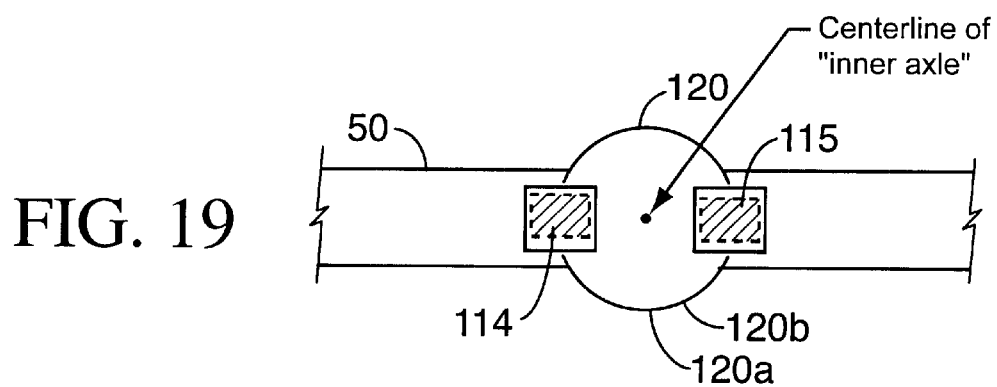
Figure 21A:
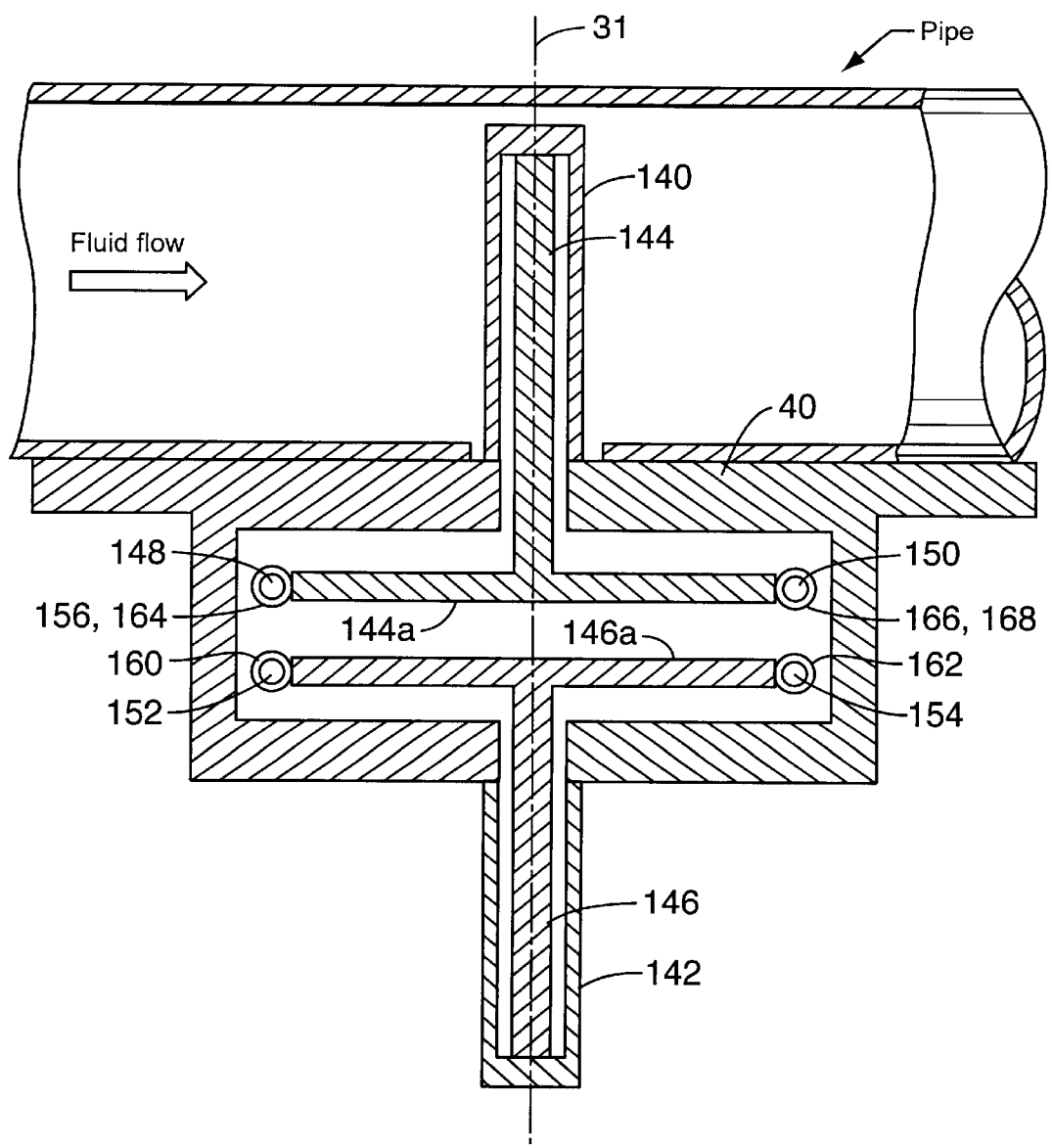
Figure 21B:
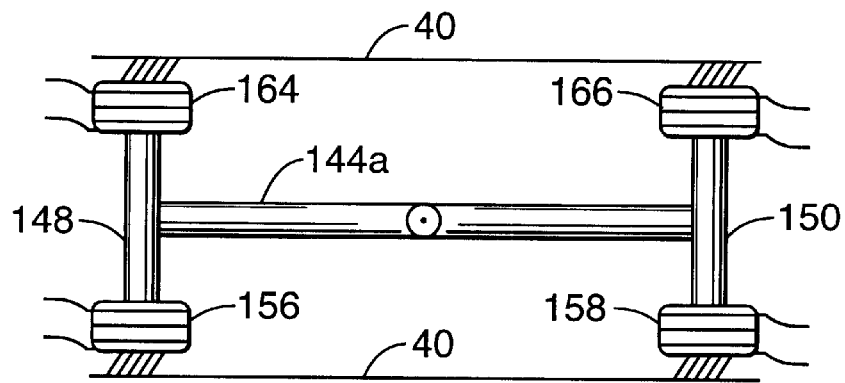

FIG. 16 is a schematic block diagram representing a synchronously demodulated "signal ratio" processing method in accordance with the present invention;

FIGS. 17 and 18 schematically depict a single motion sensor assembly in accordance with another alternative embodiment of the present invention;

FIG. 19 schematically depicts motion-sensing means for measuring vortex-induced signals of frequency VORF in accordance with another alternative embodiment of the present invention;

FIG. 20 illustrates a mass flow meter system in accordance with the present invention;

FIG. 21a depicts a linear rotational tuning fork assembly in accordance with another alternative embodiment of the present invention;

FIG. 21b depicts FSE cross-member with further detail of associated permanent magnets, solenoidal drive coils, and sense coils in accordance with the embodiment depicted in FIG 21a.

Figure 21C:
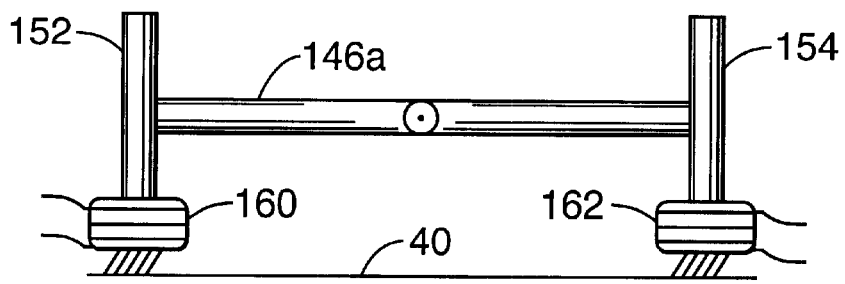
Figure 22:
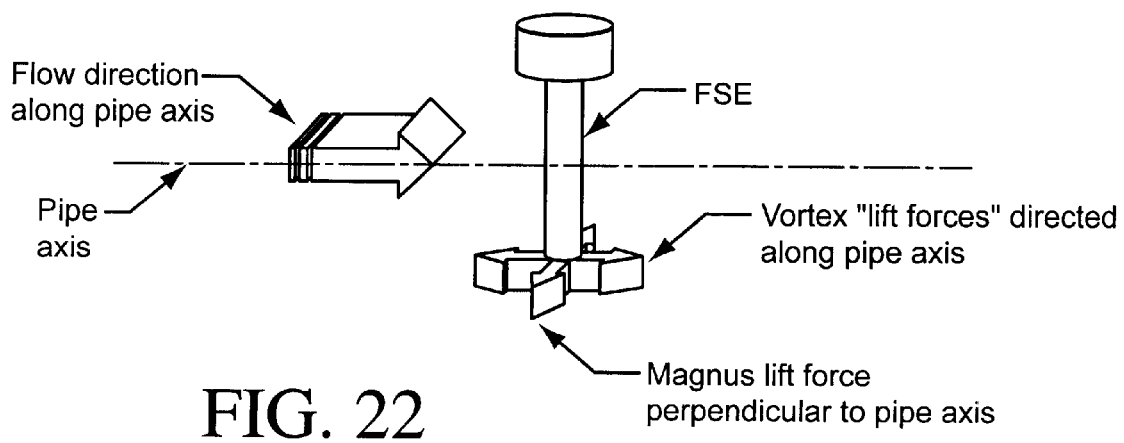

FIG. 21c depicts counter-balance cross member with further detail of associated permanent magnets and solenoidal drive coils in accordance with the embodiment depicted in FIG. 21a; and FIG. 22 is a diagram schematically illustrating the distinction between Vortex-induced "lift force" and Magnus "lift force".

DETAILED DESCRIPTION OF THE PREFERRED EMBODIMENTS

Figure 1:
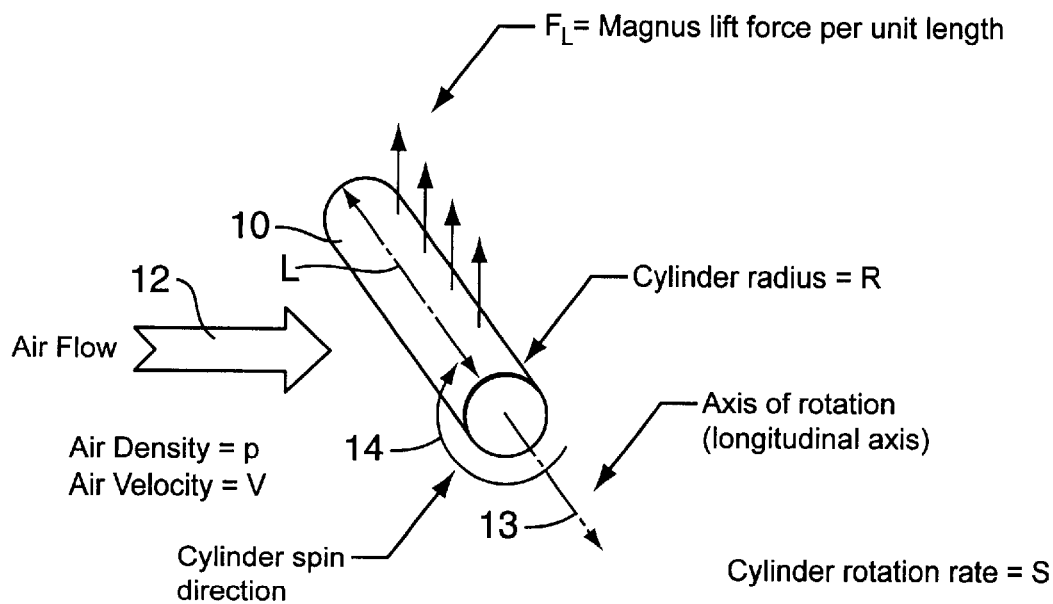
Figure 2A:
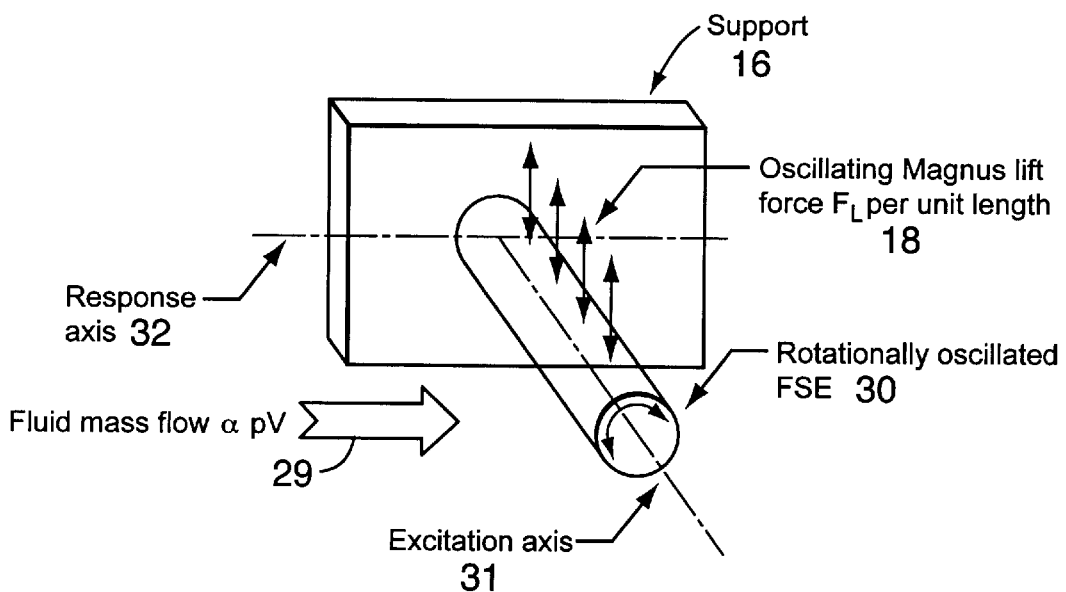

The present invention is based on the previously unrecognized principle that fluid flowing across a rotationally oscillating probe causes the probe to experience an oscillating Magnus lift force the magnitude of which relates to the fluid's mass flow rate. The present invention relates to a novel application of technology and apparatus using an oscillating structure such as that illustrated in FIG. 2a and the Magnus Effect to provide means for measuring the mass flow rate of a fluid mass. Such a mass flow meter is comprised of a support 16 and a flow sensitive element (probe) 30 attached to the support for disposition within a fluid stream the flow rate of which is to be measured. Excitation (actuator) means (not shown) impart rotational oscillation to the probe about a first (excitation) axis 31 and response-motion sense-means (not shown) generate electrical signals related to the magnitude of the Magnus lift force (or the Magnus-induced motion of the probe) indicated by the arrows 18, about a second (response) axis 32 directed perpendicular to the first axis. Electronic circuit and processor means then determine the value of the mass flow rate from the electrical signals generated by the sense-means and provide an output signal proportional the value of fluid mass flow rate.

Figure 2B:
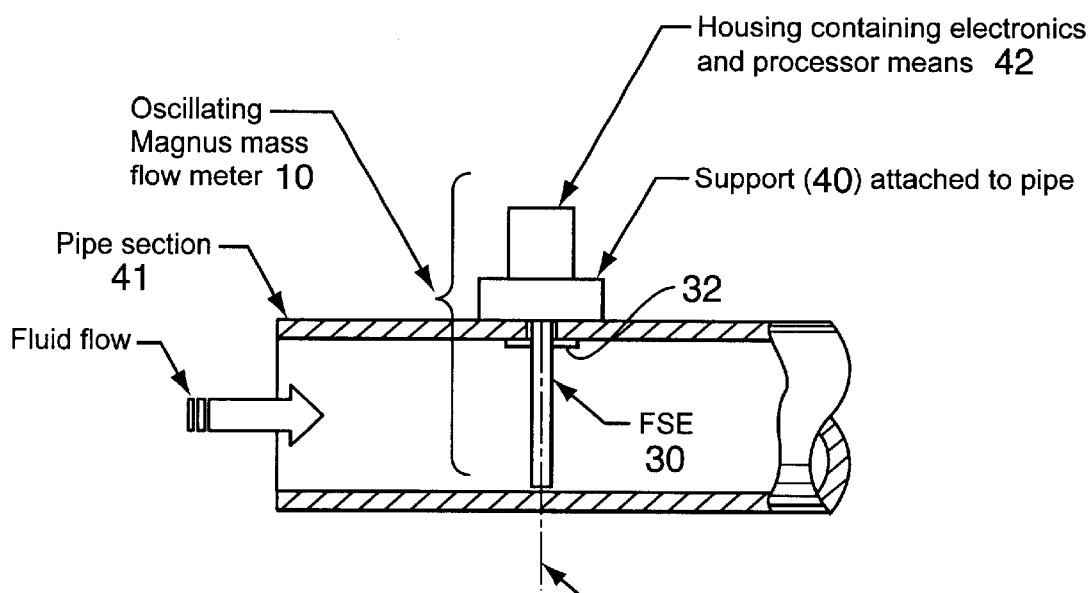

FIG. 2b generally depicts a basic embodiment of an oscillating Magnus Effect mass flow meter in accordance with the invention. This embodiment is comprised of an FSE probe assembly 30 attached to a support 40 that is in turn affixed to a pipe segment 41 carrying a fluid flow to be measured. The FSE 30 is preferably comprised of a two-component assembly arranged in a "tuning fork" configuration and is excited into rotational oscillation by an actuator means (not shown) contained within a housing 42. With the FSE extended into pipe segment 41 and a fluid flowing therein, electrical signal(s) are detected by motion sense means (also within housing 42) in response to Magnus-induced motion of the FSE, and are processed by signal-processing means to provide an electronic signal proportional to the mass flow rate. An electronic signal output to display means (not shown) provides indication of the mass flow rate value (or other measured fluid quantities).

As suggested above, fluid flowing across the FSE with direction substantially perpendicular to axis 31, in combination with the probe's torsional oscillation results in an oscillatory Magnus lift force oscillating about a response axis 32 that is substantially perpendicular to axis 31 and distributed along the portion of the probe exposed to the flowing fluid. The oscillatory Magnus force has substantially the same frequency as the applied rotational oscillation and, in the absence of significant damping, is substantially in quadrature (i.e., 90°-phase relationship) with the applied excitation. The magnitude of the Magnus lift force, the circulation, and resulting probe dynamic motion relates to the fluid mass flow rate as described in equations (1), (2), and (3). The rotational oscillatory excitation can be applied at a natural resonant frequency, a non-resonant frequency, or in an intermittent or discontinuous fashion. No restriction is placed on the angular rotational amplitude of oscillation imparted to the probe.

As indicated above, the flow sensitive element (FSE) 30 may have one of its ends attached to a support 40. The opposite end may be free and not connected thereby allowing the FSE 30 and its associated structure to effectively be mounted in a cantilevered manner to support 40. The FSE 30 can be cylindrical, spherical, a 'surface of revolution', or of another shape not necessarily cylindrically symmetric. The excitation means may include an electromagnetic or motor drive means (not shown) which imparts rotational oscillation about axis 31 by way of actuator means (e.g., an electromagnet assembly comprised of a permanent magnet and coil or motor) The resulting Magnus force oscillatory frequency is substantially the same as that of the applied torsional excitation, but 90° out of phase with the applied excitation.

Figure 2C:
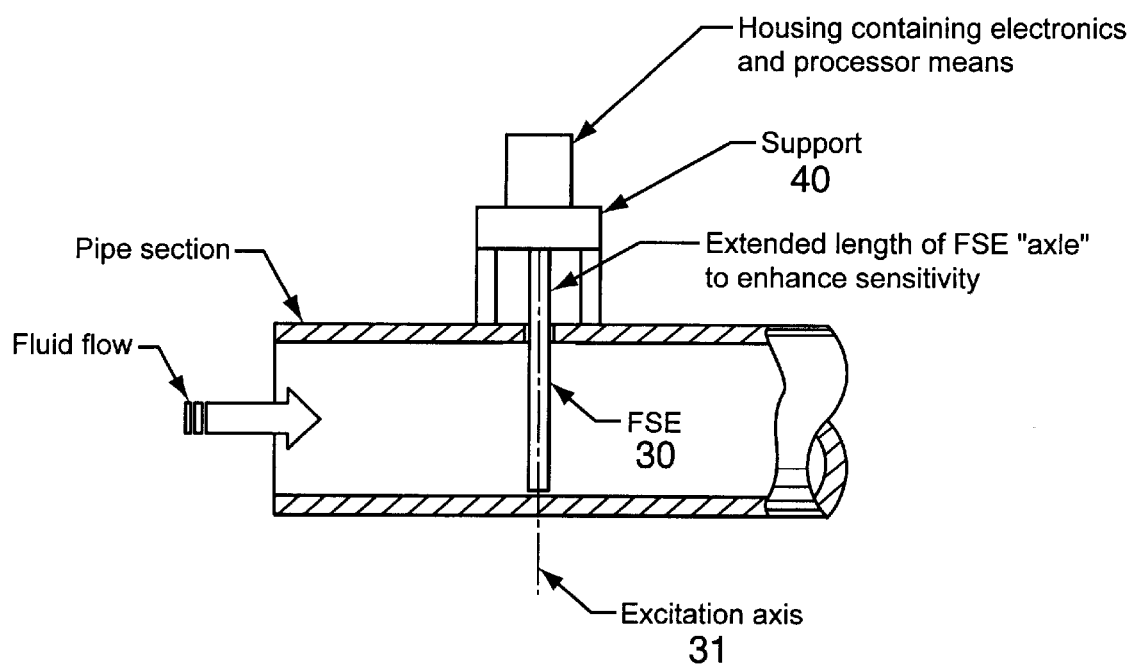

The torsional excitation frequency should be selected so as to be different from the natural frequencies of the FSE 30 in its various bending or "response" modes to prevent one vibrational mode from interfering with another. As indicated above, the rotational oscillatory excitation produces an oscillatory Magnus lift force causing FSE 30 to deflect dynamically at substantially the applied excitation frequency. The dynamic flexure of FSE 30, in response to the Magnus lift force distributed along that portion of FSE 30 exposed to fluid flow, relates in part to the magnitude of the Magnus lift force, the relative stiffness of the FSE structure and the compliance of its mounting to support 40. Note that the physical point of attachment of the probe to a support can be outside the direct flow stream. When caused to execute torsional motion, such an "extended axle", as depicted in FIG. 2c, allows greater deflection in response to the oscillating Magnus force as the bending stiffness of a beam (i.e., supporting axle) decreases with increasing beam length. The entire FSE structure, axle, and the compliance of its mounting to the support are designed to exhibit the desired static and dynamic characteristics and flexural stiffness for deflection in response to the oscillating Magnus Effect.

The FSE may have surface features that enhance the Magnus force akin to "dimples" on a golf ball or "seams" on a baseball. Such features may take the form of grooves, ridges, or dimples and may occupy only a fraction of the FSE's surface area. A combination of such surface features may be arranged in a particular pattern or may be randomly distributed.

Figure 3:
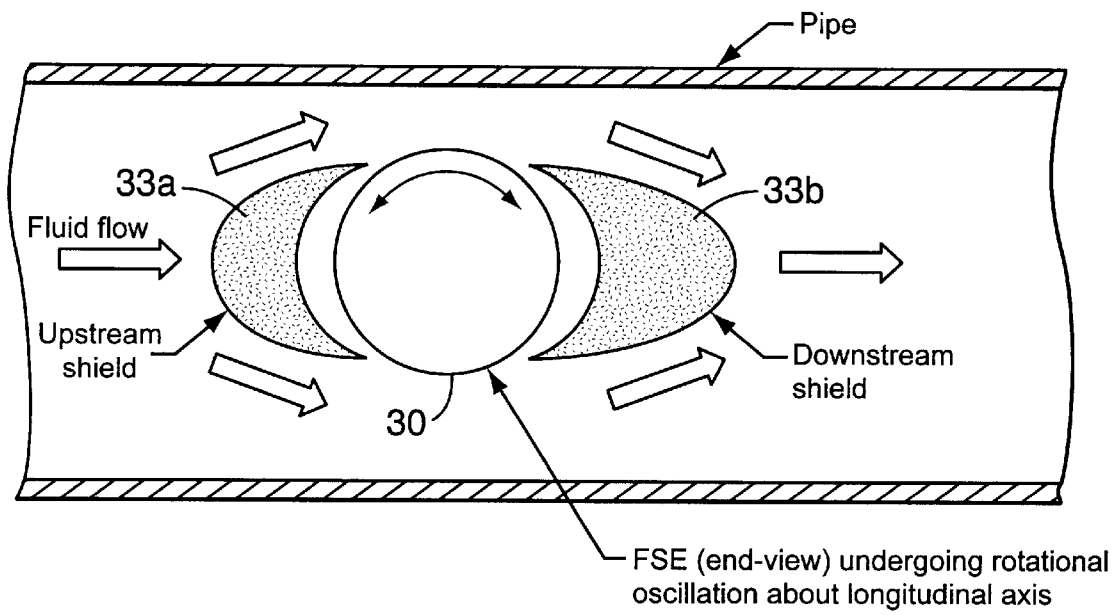
FIG. 3 is a cross-section schematically representing the use of "shields" disposed upstream and downstream of a flow sensing element in accordance with the present invention.

"Shield" structures 33a and 33b may be disposed upstream and downstream of the FSE to partially screen or shield the FSE from direct fluid flow and divert flow around the FSE as represented in FIG. 3. Such structures do not contact the FSE and expose only those portions of the FSE's surface to the flowing fluid that are responsible for generating Magnus Effect response thereby allowing the dynamic response motion of the FSE to occur in a region shielded from the direct flow stream. Such structures enhance the Magnus Effect response by effectively reducing drag forces otherwise experienced by the FSE assembly when fully exposed to flowing fluid. Such shields may have a shape conforming to streamlines to minimize drag as in an airfoil/hydrofoil. Accordingly, the upstream shield may have a different cross-sectional shape than that disposed downstream. The shield structure may split the flow into two distinct streams directing the flow tangentially over the exposed portions of the FSE's surface. The shield could also be a portion of an airfoil-like structure extending across the entire pipe or conduit upstream/downstream shields disposed across the conduit to split the fluid stream and expose only selected portions of the FSE to the fluid stream can be used to enhance sensitivity to the Magnus force. The flow-splitting structure may also be part of a "measurement section" mounted in-line with the pipe and can be advantageous for measuring low flow rates as it offers enhanced sensitivity.

Figure 4:
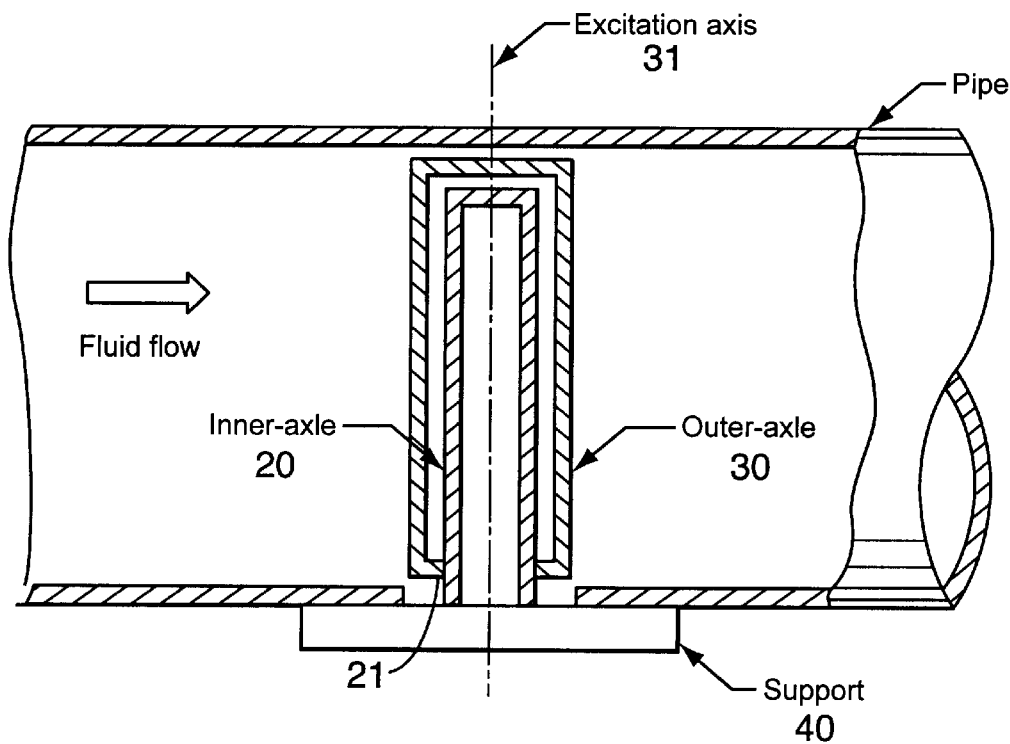
FIG. 4 is a sectional view schematically illustrating in part a "concentric tuning-fork" assembly in accordance with the present invention.

The oscillatory motion imparted to the FSE assembly by the applied excitation may produce unwanted vibrations in the support requiring increased power to sustain the desired level of rotational excitation as a result of vibrational energy coupling out of the flow sensing structure. Accordingly, employing a "rotational tuning-fork" type of structure may be beneficial. In one such rotational tuning-fork arrangement depicted generally in FIG. 4, the FSE probe effectively comprises half of a "concentric" torsional tuning-fork assembly including two structures, one disposed inside the other and attached to a support or to the another. This is accomplished by employing two elongated, concentric, tubular structures (or other shapes) wherein an "inner axle" 20 is contained within an "outer axle" 30 in a coaxial manner. The "outer axle" 30 may connect directly to the support 40, or to the "inner axle" 20 at 21 as represented in FIG. 4. As described below, the present invention provides means that cause the "inner axle" and "outer axle" to experience opposing rotational oscillations about their common longitudinal axis 31 allowing the concentric structure to have dynamic characteristics akin to that of a "torsional" or "rotational" tuning fork.

Figure 5:
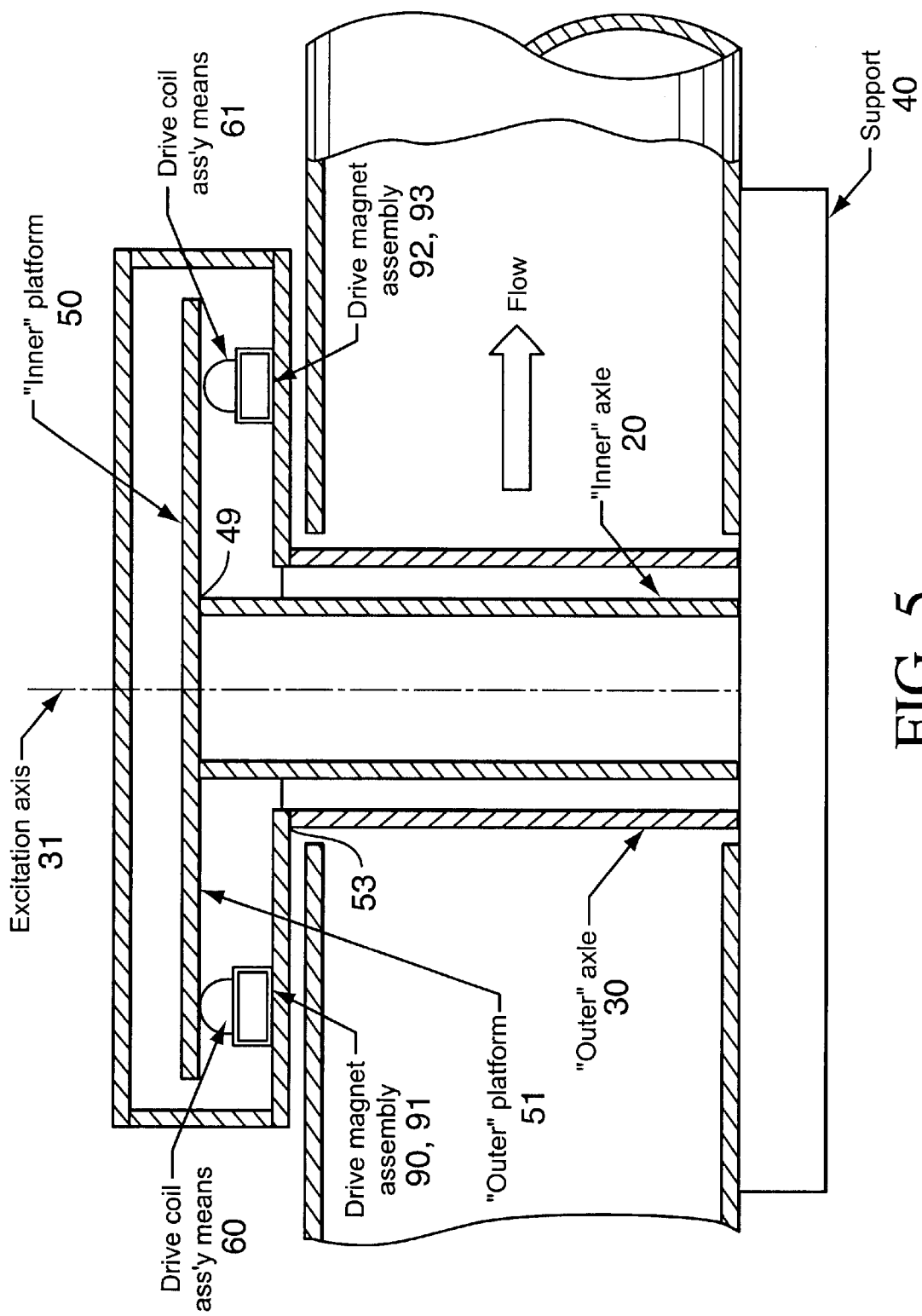
FIG. 5 is a cross-section showing details of another concentric tuning-fork structure in accordance with the present invention (response sense means not being shown)

A side view of another "concentric tuning-fork" assembly is illustrated in FIG. 5 and includes an inner axle 20, an outer axle 30, an inner "platform" 50 attached to the distal end of axle 20 at 49, and an outer "platform" 51 affixed to the distal end 53 of axle 30. Affixed to the "outer" platform 51 are permanent magnet assemblies (91,92) and (93,94) forming parts of electromagnetic drive actuator means. Attached to the "inner" platform or cross-member (50) are "drive" coil assemblies (60,61) that exert an inductive force on their corresponding and opposing magnet assemblies when energized by an electronic drive circuit excitation means as further explained below.

The configuration represented in FIG. 6a is similar to that of FIG. 5 but may be better suited for smaller diameter axles requiring more physical room offered by "cover" structure to contain the "platforms", which house the excitation "drive" and the response motion sense means. In FIGS. 6a and 6b, the FSE "extensions" allow probes 54, 55 (e.g., cylindrical or conical) to be attached to the cover 33 and have size and shape that best accommodates the measurement and installation requirements of a given flow measurement application.

In FIG. 7, the outer axle is the FSE that is wetted when disposed in the direct flow stream. One or more "node disks" (also depicted in FIG. 6a) may connect the inner-axle to the outer-axle (e.g., via welding or brazing) to provide added stiffness to rotational vibration. The node disks provide a boundary condition for terminating rotational oscillations of the axles at a location other than at the support.

One or more "node disks" may be employed to mechanically isolate the inner-outer coaxial structure from the support and also modify the torsional frequencies as desired. In FIG. 7., distal ends 56 and 57 of the "inner" axle 58 and "outer" axles 59 (or concentric tubular structures) are of sufficient size to accommodate the "platforms" without requiring additional physical extensions or clearance. In this configuration, the "outer axle" 59 also functions as the flow-sensitive element. The configurations represented by FIGS. 6a, 6b, and 7 are functionally equivalent. In FIGS. 6a, 6b, and 7, the drive actuator means (comprised of "drive" magnets 90–94 and "drive" coils 60, 61) and the response-motion sensing means (which as depicted in FIG. 6b can also be comprised magnetic-inductive sensors using suitable permanent magnets 80–84 and coils 70, 71), mount and attach in ways to insure proper operation of the mass flow sensor. For example, it may be desirable to have all coil assemblies mount to the inner-axle assembly and affixed to an associated platform or cross member.

FIG. 8 depicts further detail of "drive" actuator and "sense" magnet and coil assemblies. The drive means (drive actuator plus drive circuit) cause the concentric "inner" and "outer" axles to twist relative to one another in opposing rotational directions about axis (31) in a manner akin to a "rotational tuning fork". The "drive" actuator means and motion-responsive sensing means [comprised of coils (70, 71) and magnets (80,81) and (82,83)] mount to "platforms" 51 or suitable cross-members 50 disposed across axle structures (20) and (30). For ease of construction, all coils (drive and sense) attach to one platform and all magnets (drive and sense) attach to the other platform. Solenoidal drive coils (60, 61) are part of tuning-fork oscillator circuit means allowing the concentric tuning fork to oscillate rotationally at a resonant frequency. Wires from drive coils route through the axle assemblies and the support to drive excitation circuit means located externally.

With further reference to FIG. 8, each drive coil (60) and (61) and response motion sense coil (70) and (71) attach to a common structural member (50) mechanically connected to the inner-axle (20). Likewise, all drive magnet assembly means (91,92) and (93,94), and all sense magnet assembly means (80,81) and (82,83) attach to a common structural member (51) or outer platform that is mechanically connected to the "outer-axle" assembly or FSE (30). This arrangement depicts all magnet assemblies (drive and sense) affixed to member (51) connected to the outer-axle (and hence the FSE). Likewise, all coil assemblies (drive and sense) are affixed to member (50), which is connected to the inner-axle. As such, members (50) and (51) are inductively "coupled", but are not otherwise mechanically connected. This configuration allows drive excitation means (400) to excite rotational oscillation between the inner-and outer-axle assemblies, thereby forming a "rotational tuning-fork". Response-motion sense means detect mass flow-induced motion of the FSE or outer-axle relative to the inner-axle in response to flow-induced Magnus lift forces. The relative magnetic polarity of drive magnets contained in drive magnet assemblies (91,92) and (93,94) is such that when an associated drive coil is energized, one of its magnets will be attracted to the solenoidal coil and the other magnet repelled.

The magnetic polarization of sense magnets (80,81) and (82,83) is such that relative movement of the respective sense coil relative to the sense magnet assembly results in a net emf induced in the coil. This emf is proportional to the relative "velocity" of movement of the coil relative to that of the sense magnet assembly.

Other configurations are possible than those depicted in FIGS. 5, 6a, 6b and 7, using other drive actuator means such as reciprocating electric motor means to impart rotational oscillation. FIGS. 9a and 9b schematically depict further details, respectively, of response-motion sense means and drive actuator means using solenoidal coils and magnets.

The FSE need not have its entire surface exposed to the flow stream. Only a portion need be exposed as depicted conceptually in FIG. 10. This configuration has benefit in applications requiring less obstruction or lower pressure drop across the "measurement section" containing the flow metering assembly. Other configurations of a 'partially wetted' FSE are possible besides that depicted in FIG. 10 that mount into other than straight sections of conduit.

The FSE can have a tuning-fork configuration where both tines are directly exposed to the flowing fluid as depicted conceptually in FIGS. 11a and 11b. Such configurations lend themselves to micro-miniaturization using MEMS or micromachined Quartz fabrication technology. Such configurations, with tines rotationally oscillated, are depicted in FIGS. 11a and 11b. Tines respond to fluid flow by dynamically bending or flexing in a "traditional" tuning-fork manner, but at the applied rotational excitation frequency, not a natural "bending" frequency of the tuning fork.

Another rotational tuning-fork arrangement, a "linear rotational tuning fork" with respect to FIG. 21a described below, comprises two elongated structures disposed oppositely along a common longitudinal axis. One elongated structure constitutes the FSE inserted into the fluid stream. The opposing structure, disposed external to the fluid stream, acts as a dynamic counter-balance and can provide a reference for measuring the relative dynamic response characteristics of the FSE. As described below, the present invention provides means to impart opposing rotational oscillations to the FSE and its counterbalance about a common longitudinal axis allowing the structure to resemble a "torsional" or "rotational" tuning fork.

With reference to FIG. 21a, a "linear rotational tuning fork", is comprised of two elongated structures (140) and (142) disposed oppositely one another along common longitudinal axis (31). One elongated structure (140) constitutes the FSE inserted into the fluid stream. The opposing structure (142) placed external to the fluid stream acts as a dynamic counter-balance for the FSE. Connecting rod (144) is fixedly attached to the FSE structure (140). Likewise, the counterbalance structure has connecting rod (146) fixedly attached to the counter-balance structure (142). Permanent rod magnets (148) and (150) are attached at symmetrically opposite locations on FSE connecting-rod cross-member (144a). Similarly, permanent rod magnets (152) and (154) are attached at symmetrically opposite locations on counterbalance connecting-rod cross-member (146a). Permanent magnet assemblies (148) and (150) are mounted adjacent respective drive-coil means (156) and (158) that provide drive actuation means for imparting rotational oscillation to the FSE connecting rod (144) and hence to FSE (140). In a similar manner, permanent magnet assemblies (152) and (154) are mounted adjacent respective drive-coil means (160) and (162) that provide drive actuation means for imparting rotational oscillation to counter-balance connecting-rod (146) and hence to counter-balance (142). Magnets (148,150) and (152, 154) are mounted to their respective connecting-rod cross members (144a, 146a) and their respective coils (156, 158, 160, 162) are connected to support (40). Magnetic polarities of magnets (148,150) and (152, 154) and windings of respective coils (156, 158, 160, 162) are so oriented and designed that, electrical signals emanating from drive excitation means (400), the FSE connecting-rod cross-member (144a) and its opposite counter-balance cross-member (146a) are caused to rotate in anti-phase, in opposing angular directions, thereby imparting to the FSE and its counterbalance a rotational oscillation in opposite rotational directions, thereby forming a "linear rotational tuning-fork". Furthermore, the relative magnetic polarity of drive magnets contained in drive magnet assemblies (148,150) and (152, 154) is such that when an associated adjacent drive-coil is energized, one of its magnets will be attracted to the solenoidal coil and the other magnet repelled. This imparts a rotational twisting motion to each connecting-rod cross member, but in opposing rotational directions. Drive coils (156, 158, 160, 162) can be part of tuning-fork oscillator circuit means allowing the linear tuning fork to oscillate rotationally at a resonant frequency.

The rotational motion imparted to FSE (140) and its connecting-rod (144) can be effected in any desired modes of oscillation, in-phase or out of phase. The same considerations apply to counter-balance (142) and its connecting-rod assembly (146). The FSE and its counterbalance should have substantially equal moments of inertia about their common excitation axis relative to their respective rotational "spring constants" in order to frequency-match tines of the "rotational tuning fork".

Motion-responsive sense coils (164) and (166) are mounted adjacent magnets (148) and (150) and are affixed to support (40). Rotational oscillatory motion imparted to the FSE and its connecting-rod assembly (144), cause magnets to induce alternating electrical signals into sense coils (164) and (166). Signals induced respectively into coils (164) and (166) by magnets (148) and (150) provide signals Y1 and Y2 for subsequent signal processing to obtain fluid mass flow rate as determined below in FIGS. 14, 15, or 16.

Theoretical Principles of Operation & Signal Processing

Coordinate axes placed conceptually on the end-face of an FSE as illustrated in FIGS. 12a and 12b, facilitate a theoretical description of the FSE's motion to the applied rotational excitation and the resulting oscillatory Magnus lift force response. The cylinder twists continuously along its length as torsion is applied. For purposes of mathematical simplicity, the FSE is assumed to twist and rotate uniformly as a rigid body along its entire length. This approximation, in this particular example, does not detract from the basic concept of the present invention because the maximum angular twist resulting from the applied oscillation is typically only several degrees. Additionally, it does not apply to all embodiments. Theoretically, one can understand the (idealized) motion of the FSE in the following manner. With reference to FIG. 12a, in a "no-flow" condition, the FSE executes rotational oscillation, but without any Magnus lift force. Accordingly, the displacements, as measured at two symmetrically placed motion sense positions, represented by Y1 and Y2 are equal and opposite, namely:

$$Y1 = A\sin(\omega t) = -Y2 \tag{4}$$

where $\omega=2\pi f$, f=oscillation frequency (f may be a natural resonant frequency of a torsional mode of oscillation or may result from a forced oscillation) and t=time. $A=R\Theta_0$, where R is the radius of the cylinder, and $\Theta_0$ is the peak angular displacement. $\Theta=\Theta(t)$ is the applied rotational excitation as a function of time and is expressed as:

$$\Theta = \Theta_0 \sin(\omega t) \tag{5}$$

The circulation, $\Gamma$, can be expressed as, $$\Gamma = \int_C V_R dr = \int_C \{d(R\Theta)/dt\} dr = 2\pi\Theta_0 R^2 \omega \cos(\omega t) \tag{6}$$

$F_L$ is the Magnus force per unit length and $F_L = \rho V\Gamma = Q_M\Gamma/A_c$ is proportional to $\cos(\omega t)$, so the Magnus lift force, $F_L$, is 90° out of phase with the applied excitation which is proportional to $\sin(\omega t)$ (assuming that the effective "damping constant" is negligible in terms of forced-vibration of a damped second-order system). If the FSE structure happens to obey Hooke's Law, the instantaneous flexural displacement of the FSE is proportional to the Magnus lift force. The total displacement of the FSE (measured at the locations of the motion-sense means) is due to Magnus-induced displacement plus the amount of physical displacement due to the applied rotational excitation. Thus, by superposing the excitation and response motion, the total motion can be theoretically described. If "B" represents the physical displacement at the response-motion sense-means location due to the Magnus force, $F_L$, then applying Hooke's Law one obtains $$F_L = \rho V\Gamma = Q_M\Gamma/A_c = -kB \tag{7}$$

where k, the effective "elastic spring constant" of the structure, is the amount of force producing a unit displacement at the response-motion sense-means location(s). Equation (7) applies to the (simplified) case where the entire Magnus force load is applied at the end of the beam or FSE and B represents the corresponding deflection. However, depending on how the Magnus force is distributed along the probe, other equations known to those of ordinary skill can also employed to relate the deflection of the "beam" resulting from a distributed Magnus force. Note that the Magnus force per unit length is, $F_L = \rho V\Gamma = Q_M\Gamma/A_c$. Thus, neglecting the minus sign in equation (7), the magnitude of displacement, B, can be expressed as:

$$B = |F_L|/k = Q_M\Gamma/(A_c k) \tag{8}$$

$$= Q_M \Theta_0 2\pi R^2 \omega/(A_c k)$$

With a concentric tuning-fork configuration, electromagnetic actuator means and drive circuit means impart rotational oscillatory motion to the "platform" structures attached to their respective inner- and outer-axles as described above. Likewise suitable response-motion sense means can be affixed to the "platforms". If the platforms are viewed end-on, the relative placement of excitation and motion sensing means is conceptually represented in FIG. 13. The longitudinal axis of sensor should be substantially perpendicular to the direction of fluid flow. FIG. 13 serves only to schematically depict possible relative placement of drive actuator means and sense means on the platforms. It is understood that two platforms (or suitable cross-members) are employed, each attached to their respective inner- and outer-axles. Drive actuator means D1 and/or D2 can be located anywhere along the platforms, preferably in a symmetric, diametrically opposing configuration along HCL, VCL, or another location as shown in FIG. 13.

Depending on the signal-processing approach used, the response-motion sensing-means can be located along the HCL or X-axis, but must be preferentially responsive to motion along or parallel to the VCL or Y-axis. The placement of actuator and sense means must be consistent with dynamic balance considerations.

This requires that drive actuator means and response motion sense-means combined with their associated assemblies, mounting platforms, or cross-member assemblies, have substantially equal moments of inertia about their common excitation axis relative to their respective rotational "spring constants" in order to frequency-match tines of the "rotational tuning fork".

Alternatively, if only one response motion sensor (such as schematically represented by S3) is employed, it could be located along the VCL preferentially sensitive to motion along and parallel to the Y-axis. The relative placement of drive actuator means and response motion sensing means on the platforms is depicted schematically in FIG. 13, but the entire structure must be dynamically balanced to minimize drive power and not introduce any substantial dynamic imbalance, which may otherwise cause unwanted vibrations. Thus, each axle must have substantially the same resonant rotational frequency in the excitation mode. That is, the combination of the masses attached to each axle and platform, their corresponding moments of inertia, and their ratio to the respective spring constants must collectively result in substantially the same torsional frequency for each axle. That is, each tine of the concentric tuning-fork must have substantially the same frequency in order to have a tuning-fork with "matched" tines. With reference to FIG. 12b, superposing the two motions, rotational excitation plus response, under a "flow" condition, the FSE executes rotational oscillation plus dynamic flexural deflection resulting from the oscillatory Magnus lift force. Thus, the resulting displacements, Y1 and Y2, as measured at two (symmetrically opposing) sensing locations (e.g., S1 and S2 in FIG. 13) can be represented as:

$$Y1 = A\sin(\omega t) + B\cos(\omega t) \tag{9}$$

$$Y2 = -A\sin(\omega t) + B\cos(\omega t) \tag{10}$$

A and B can be expressed in more fundamental terms using the above equations as:

$$A = R\Theta_0 \tag{11}$$

$$B = Q_M \Theta_0 2\pi R^2 \omega/(A_c k) \text{ (from 8 above)} \tag{12}$$

The instantaneous deflection, B, of the FSE due to the Magnus lift force is illustrated in FIG. 12c. The actual deflection may only be a fraction of a millimeter, so the deflection shown in FIG. 12c is greatly exaggerated.

The present invention teaches several methods to determine mass flow rate by processing the signals represented by equations (9) and (10) (or their "velocity", or "accelerations"

counterparts). Note that the term, $A \sin(\omega t)$, physically represents the instantaneous displacement at the response motion measurement locations due to the applied rotational excitation as measured at the response motion measurement sensor location. The term, $B \cos(\omega t)$, physically represents the instantaneous incremental "lift" displacement due to the Magnus force. The following mathematical descriptions of signal-processing methods and signal representations relate to using response-motion sensors of the "position-type" symmetrically placed about axis (31). If other motion sensors were used of the "velocity-type" (i.e. permanent magnet and inductive-pickup coil), then the corresponding equations representing signals (9) and (10) require differentiation relative to time to be mathematically precise. However, the signal processing manipulations taught in the present invention apply and can be adapted to various types of motion sensors whether they correspond to sensors of the "position" or "displacement", "velocity", or "acceleration" type.

Time (or Phase) Difference Signal-Processing Method

Y1 and Y2 can be rewritten and represented as:

$$Y1 = C \sin(\omega t + \Delta\Phi) \quad (13)$$

$$Y2 = C \sin(\omega t - \Delta\Phi) \quad (14)$$

Where $$C = \sqrt{(A^2 + B^2)}$$

and $$\Delta\Phi = \arctan(B/A). \quad (15)$$

Typically, $B/A \ll 1$, so that $$\Delta\Phi = \omega(\Delta t) \approx B/A \quad (16)$$

$$= \{Q_M \Theta_0 2\pi R_\omega^2 / (A_c k)\} R \Theta_0$$

Thus, $$B/A = Q_M 2\pi R \omega/(A_c k) = \omega(\Delta t) \quad (17)$$

Note that $\omega(\Delta t)$ is the phase shift of Y1 relative to Y2; $\Delta t$ is the time difference between Y1 and Y2. Thus, $$Q_M = (\Delta t) / \{2\pi R/(A_c k)\} \quad (18)$$

Hence, the mass flow rate, $Q_M$, is proportional to the time difference, $\Delta t$, between the two signals represented by Y1 and Y2, and is independent of rotational excitation amplitude $\Theta_0$, independent of frequency $\omega$, and hence independent of the circulation $\Gamma$. The constant, k, depends partially on the elastic modulus of the axle's material and the compliance of the axle's mounting to the support and exhibits a known (small) temperature dependency (via Youngs Modulus). Depending on the desired accuracy for measuring $Q_M$, a small temperature correction may be implemented by measuring the temperature of the FSE or "outer axle" at a suitable location and using processing means to calculate and apply the desired temperature correction to the value of "k" in (18).

The time-difference, (or equivalent, "phase-difference") method, is illustrated conceptually in FIG. 14. Electrical signals from magnetic inductive pick-ups (70, 71) are detected and amplified by amplifier means, AMP, further amplified by saturation amplifier means, SAT, which convert signals represented by Y1 and Y2 to square-wave signals, which in turn are used to "start" and "stop" a counter accumulating "counts" from "clock" means, CLK. The counts so accumulated are proportional to the (fixed) clock rate and the time difference $\Delta t$ allowing the time difference, $\Delta t$, or equivalently, phase difference $\omega(\Delta t)$ to be measured from which electronic processing means calculate mass flow rate $Q_M$. Additional electronic means can be provided to indicate the value of $Q_M$ in the form of an electronic signal or digital display.

Equivalently, if one were to employ means to determine the phase shift $\Delta\Phi = \omega(\Delta t)$ rather than time difference $\Delta t$ to determine mass flow rate $Q_M$, equation 18 can be re-expressed as $$Q_M = \Delta\Phi / \{2\pi\omega R/(A_c k)\} \quad (18a)$$

Accordingly, employing 18a requires knowledge of frequency $\omega$.

Signal-ratio Method

It was shown above that Y1 and Y2 can be represented as, $$Y1 = A \sin(\omega t) + B \cos(\omega t) \quad (9)$$

$$Y2 = -A \sin(\omega t) + B \cos(\omega t) \quad (10)$$

The difference and sum of signals represented by Y1 and Y2 results in two AC-signals, namely:

$$\text{DIFF} = Y1 - Y2 = 2A \sin(\omega t) \quad (19)$$

$$\text{SUM} = Y1 + Y2 = 2B \cos(\omega t) \quad (20)$$

Performing 90° integration on the signal represented by SUM, one obtains an integrated sum signal represented by ISUM:

$$ISUM = \int (Y1 + Y2) dt \quad (21)$$

$$= (2B/\omega) \sin(\omega t)$$

Converting the AC-signal, ISUM, to a substantially DC, "average", or RMS, or peak-value signal, <ISUM>, using a suitable electronic processing operation represented by < >, one obtains:

$$<ISUM> = < \int (Y1 + Y2) dt \geq 2B/\omega \quad (22)$$

$$= 2\{Q_M \Theta_0 2\pi R^2 \omega / (A_c k)\}/\omega$$

$$= 4\{Q_M \Theta_0 \pi R^2 / (A_c k)\}$$

similarly for the difference signal, DIFF, one obtains a signal proportional to:

$$<\text{DIFF}> = <Y1-Y2> = 2<A> = 2<R\Theta_0> \quad (23)$$

Forming the ratio of the two substantially DC signals, <ISUM>, and <DIFF>, one obtains:

$$<ISUM>/<DIFF> = < \int (Y1+Y2)dt > / <Y1-Y2> \quad (24)$$

$$= 4\{Q_M \Theta_0 \pi R^2 / (A_c k)\}/[2R\Theta_0]$$

$$<ISUM>/<DIFF> \geq Q_M 2\pi R / (A_c k) \quad (25)$$

Thus, mass flow rate, $Q_M$, can be determined from:

$$Q_M = \{<ISUM>/<DIFF>\}/(2\pi R/(A_c k)) \quad (26)$$

This signal-processing method for determining $Q_M$ is independent of rotational excitation frequency $\omega$ and independent of amplitude $\Theta_0$. Importantly, this technique allows determination of mass flow rate independent of circulation $\Gamma$. This method is schematically represented in FIG. 15, where electrical signals from coils (70,71) are detected and amplified by means, AMP, and input to sum and difference amplifier means forming signals represented respectively by SUM and DIFF. The SUM signal is input to 90° integrating amplifier means, INT, forming the integrated sum signal represented by, ISUM. Signal represented by ISUM is input to an averaging, RMS, or "peak-picking" circuit means to generate a substantially DC-signal, <ISUM>. The DIFF signal is also converted to a substantially DC-signal, <DIFF>, by suitable averaging, RMS, or peak-picking circuit processing means. Signals proportional to <ISUM> and <DIFF> are digitized by analog-to-digital converter circuit means and input to processing means for determining mass flow rate $Q_M$ in accordance with equation (26).

Other analog and digital signal manipulations and processing methods known to those of skill in the art are also possible, which relate the magnitude of the Magnus lift force (or a signal proportional thereto) to mass flow rate (note in all equations above, $B \propto F_L/\Gamma$).

Synchronous Demodulated Signal-Ratio Method

For applications where increased immunity to noise is desired, it may be advantageous to employ a synchronous demodulation method. Summing amplifier means form a sum signal proportional to (Y1+Y2) represented by SUM. Integrating amplifier means, INT, form an integrated sum signal, ISUM, and difference amplifier means form the difference signal DIFF=(Y1−Y2). "Lock-in" amplifier means, LIA, amplify ISUM and employ saturation amplifier means, SAT, to convert a signal represented by DIFF to a square wave reference signal, REF, for the lock-in amplifier, LIA, thereby providing means to demodulate the AC-signal, ISUM, relative to the in-phase components of the AC-signal, DIFF. Ideally, signal ISUM should be in-phase with signal DIFF as can be seen from (19) and (21) above. A square-wave-type reference signal, REF, for the lock-in amplifier means, LIA, is obtained from DIFF by amplifying DIFF using saturation amplifier means, SAT. Demodulating ISUM relative to substantially square-wave reference signal, REF, removes out-of-phase components from ISUM not associated with mass flow that could otherwise contribute to mass flow rate measurement errors. Low-pass filter, LPF, (e.g., RC filter) filters the output of the LIA amplifier and performs an averaging function. This signal-processing method is represented schematically in FIG. 16, where electrical signals from magnetic inductive pickups (70) and (71) are amplified by means, AMP, and input to sum and difference amplifier means to respectively form substantially AC-signals SUM and DIFF.

The SUM signal is input to 90° integrating amplifier means, INT, forming the integrated sum signal, ISUM, and presents that signal in turn to lock-in amplifier means, LIA. The DIFF signal is input to saturation amplifier means, SAT, thereby generating substantially square wave reference signal, REF, for the LIA means. Accordingly, the LIA means amplifies signal components of ISUM substantially in-phase with REF and outputs a synchronously rectified signal to low-pass filter-means LPF. LPF averages the synchronously rectified signal proportional to ISUM and outputs a substantially DC-signal. Subsequent A/D conversion yields an electronic signal proportional to an "averaged" ISUM signal, <ISUM>. Electrical signals proportional to <ISUM> and <DIFF> are input to electronic processing means for determining mass flow rate, $Q_M$, in accordance with equation (26) and using electronic means to obtain electronic output signals proportional to mass flow rate $Q_M$. Note that this technique using synchronous demodulation results in a determination of mass flow rate $Q_M$ that is independent of rotational oscillation frequency $\omega$ and amplitude $\Theta_0$ and hence circulation $\Gamma$.

One of ordinary skill will realize that additional signal conditioning or amplification of signals and possibly additional components may be required without departing from the signal-processing concepts represented schematically in FIGS. 14, 15, and 16.

Single-Sensor/Single-Signal Method

Employment of one motion responsive sensor, S3, is another method to measure mass flow rate. Placement of sensor, S3, on the VCL axis, yields a signal preferentially responsive to motion due to the Magnus lift force and not the motion associated with rotational "excitation".

That is:

$$S3 = B \cos(\omega t) \tag{27}$$

The amplitude of signal S3, B, relates to $Q_M$ as:

$$B = Q_M \Theta_0 2\pi R^2 \omega/(A_c k) \tag{28}$$

Using known means to measure the amplitude of substantially AC-signal, S3, the mass flow rate can be determined from measuring the amplitude from one signal derived from one response motion sensor means, thus:

$$Q_M = B/\{\Theta_0 2\pi R^2 \omega/(A_c k)\} \tag{29}$$

A single signal measurement method can be realized with two sensors (S3, S3') located symmetrically opposite each other along VCL by electrically combining their outputs in such a way as if they comprised but one combined sensor having one electrical signal output of amplitude proportional to B. Depending on the polarity of S3, S3' sense magnets and the relative direction of their respective coil's windings, the outputs of the sense coils S3, S3' can be electrically combined in a series-aiding manner so that the outputs from the two sensing means algebraically add and combine to produce but one electrical signal. Since $\omega$ is substantially constant, along with other proportional quantities in equation (29), their actual values can effectively be "calibrated out" implicitly by factory calibration of the flow sensing instrument.

The use of one sensor (or sense means with one signal output) rather than two separate motion-responsive sensors with two separate outputs is depicted in FIGS. 17 and 18. This concept is illustrated using a magnet-coil inductive pick-up as represented by coil (110) mounted substantially on the centerline of the inner-axle so as to respond only to Magnus-induced lift forces substantially perpendicular to supporting cross-member (50). The associated permanent magnet assembly represented by (103a, 103b), (104a, 104b), magnet support assemblies (103c, 104c) attach to the outer-axle "platform" (51) as depicted in FIG. 8.

The inductive pick-up design depicted in FIGS. 17 and 18 should be substantially insensitive to motion parallel to cross member 50 (which is aligned substantially parallel to the flow direction, parallel to the pipe- or conduit-centerline) and preferentially responsive to motion perpendicular to (50), motion which is indicative of the mass flow-induced Magnus lift force.

The above methods illustrate several signal-processing methods to determine, mass flow rate using the present invention. Other equivalent signal-processing methods are possible within the scope of the present invention, provided that at least one sensor generates an electrical output proportional (or related to) to the magnitude of the Magnus force or some parameter of the "response" motion of the FSE related to the magnitude of the Magnus force using sensors (for S1, S2, or S3) for sensing the "position" (e.g., strain gauges, capacitance, laser, photoelectric, proximity, LVDT, Hall-Effect),"velocity" (magnetic-inductive magnet & coil) or "acceleration" (accelerometers), all of which are "motion responsive" in the teaching of the present invention. Other sensors (digital or "on/off" counterparts of the above sensors) known to those of ordinary skill in the art can also be used in the present invention. Such "motion responsive" sensors measure or report a dynamic motion characteristic proportional or related to the magnitude of Magnus Effect lift force. In the present invention, such sensors are considered equivalent to other sensing means that directly measure force magnitudes or strains proportional to forces. The response motion sensing means described in the present invention need only measure a property related to the Magnus Effect force magnitude and provide an electrical output relating directly or indirectly to that force magnitude. Other sense means that measure the magnitude of the Magnus Effect lift force directly (or a quantity proportional thereto) or related to that force, are considered equivalent response-motion sense means in the context of the present invention, because the fluid mass flow rate relates to the magnitude of the Magnus Effect force. If a given FSE structure did not adhere to Hooke's Law (i.e., has a non-linear relationship between the magnitude of Magnus Effect lift force and mass flow rate), such an apparatus is included in the context of the present invention, as the mass flow rate relates to the magnitude of the oscillatory Magnus Effect lift force.

Analog signal-processing, analog or digital phase detection, digital signal-processing (DSP) means which digitize the analog signal waveforms of the motion response sensors using DSP chips; microprocessors, micro-controllers, synchronous demodulation methods, phase-locked-loop methods, or other analog and digital signal-processing circuits and methods known those of ordinary skill in the art, fall within the scope of the present invention. These techniques are included in the teaching of the present invention and useful as a matter of design choice depending on the desired cost/performance characteristics of a particular fluid mass flow meter design.

The above descriptions of signal-processing methods and signal representations in equation form relate to sensing means or motion sensors of the "position" or "displacement" type. If other types of motion sensors are used, say those of the "velocity-type" using magnet-coil inductive pick-ups, the corresponding equations representing "position" or "displacement" signals from such sensors require appropriate differentiation relative to time.

However, the general signal-processing methods and signal manipulations represented in FIGS. 14, 15, and 16 apply. For example, when using magnet-coil inductive motion sensors, which are of the "velocity-type", the following equations require differentiation relative to time including equations: 4, 5, 9, 10, 13,14, 19, 20, 27. However, while this consideration is more rigorously correct, mathematically, the signal-processing manipulations represented in FIG. 14, 15, or 16 or their equivalents still apply for determining mass flow rate. For example, with reference to FIG. 14, the signals emanating from amplifiers AMP could be further amplified by integrator means effectively converting "velocity" signals into "position" signals. However, for purposes of determining mass flow rate, the time difference, $\Delta t$, (or phase difference) between the two signals is the same regardless of whether such signals represent relative "position" or "velocity". Similar considerations apply to the methods depicted in FIGS. 15 and 16.

For purposes of illustrating theoretical aspects of the present invention, sinusoidal excitation and response waveforms have been assumed. Such idealized waveforms illustrate various excitation and signal-processing methods to determine mass flow rate. However, the sinusoidal waveforms employed are an idealized simplification used only to facilitate description of the invention's theoretical operation. Rather, more complex or more realistic waveforms could be employed (e.g., non-sinusoidal) including intermittent or discontinuous rotational excitation (rather than square wave or sinusoidal), without departing from the teachings of the present invention. Similarly, the alternating rotational excitation of the FSE is not restricted to any particular maximum angular displacement and could comprise a substantial fraction of a complete 360° rotation.

Other analog and digital signal manipulations and processing methods known to those of skill in the art are also possible, which relate the magnitude of the Magnus lift force (or a signal proportional thereto) to mass flow rate. FIGS. 14, 15, and 16 do not represent complete circuit diagrams or electronic circuit schematics, but rather schematic block diagrams conceptually depicting salient features of several signal-processing methods and concepts. Depending on the desired accuracy for determining mass flow rate, simplifying approximations to the signal-processing methods depicted in FIGS. 15 and 16 can be justified or rationalized. While not rigorously correct mathematically, the term 2Y1 can be used in place of the precise difference signal DIFF. That is DIFF$\approx$2Y1 instead of Y2−Y1, since A>>B. Also, the DIFF signal in FIGS. 15 and 16 can be measured and/or applied on an intermittent or sampled basis rather than continuously. Likewise, when measuring phase difference $\omega(\Delta t)$ or time difference $\Delta t$, one could implement a time or phase difference measurement where only one of the signals is derived from measuring a parameter of response motion (rather than two such motion responsive signals), the other signal being derived from the applied rotational excitation. Such approximations to the more precise equations (i.e., 18 and 26) can further simplify the implementation of the invention without departing from its basic teaching and are considered a matter of design choice.

Flow Velocity & Density Measurement

The "Strouhal Effect" or "von Karman Effect", wherein vortices are shed from a "bluff body" (in this case, the probe or FSE), cause a slight force to be exerted on the FSE as each vortex is shed. The phenomenon of vortex shedding is the subject of "vortex flow meters" and is a well-known phenomenon and well known to those of skill in the art for determining flow velocity (or volumetric flow rate). The shedding of vortices from a "bluff body" typically occurs at Reynolds numbers >50 or so, and give rise to the familiar von Karman "vortex street". As each vortex sheds from the bluff body, a small force is exerted on the FSE. A bluff body (or FSE) in continual flowing stream results in shedding a continual stream of vortices. Accordingly, corresponding periodic forces are exerted on the FSE at a frequency corresponding the rate of vortex shedding (VORF) substantially proportional to flow velocity V. These periodic forces exerted on the FSE may induce the FSE structure to vibrate at a frequency, VORF, proportional to fluid flow velocity. The vibrations induced into the FSE typically occur substantially along the direction of the general flow stream. Additional sensing means incorporated into the FSE of the present invention preferentially sense vibratory movement "back and forth" along the "x-axis" (see FIG. 10) in response to the vortex-induced deflection of the FSE. This allows generation and measurement of a signal whose frequency is substantially proportional to the flow velocity as if the FSE were a "vortex flow meter" (the FSE being the "bluff body") and using electronic circuit means to measure and determine the vortex shedding frequency VORF known to those of ordinary skill in the art. This allows determination of fluid flow velocity (or equivalently volumetric flow rate) independent of mass flow rate as determined from the Magnus effect. Determination of fluid density, $\rho$, is enabled by and is proportional to the ratio of measured mass flow rate, $Q_M$, divided by the vortex frequency VORF or a signal proportional thereto.

The rate at which vortices are shed from the FSE may differ when the FSE is rotationally oscillated compared to when it is "at rest" (like a "bluff body") and not rotationally oscillated.

Any differences in response using this alternative approach may be accounted for in the mass flow instrument's calibration. However, the above consideration pertaining to measuring density applies even if the FSE is not rotationally oscillated while performing the vortex shedding frequency measurement VORF. An alternative approach to measure flow velocity is to interrupt (intermittently or periodically) the rotational oscillation of the FSE in order to perform the vortex frequency measurement (using electronic circuit means known to those of skill in the art).

To clarify the term, "lift force", it is known in the prior art literature describing vortex shedding phenomenon from "bluff bodies" that a "lift force" results when a vortex sheds from a "bluff body" (in this case the FSE) at a rate corresponding to the flow velocity. However, this vortex-induced "lift force" should not be confused with the oscillating Magnus lift force of the present invention (that results from "mechanically induced" circulation of the FSE). It an unfortunate usage of language in the technical literature that leads to confusing the description of different phenomena using identical terminology. Such vortex-induced "lift forces" can arise if the FSE is stationary. Importantly, the Magnus-induced lift forces arise only when the probe or FSE is rotated. FIG. 22 schematically represents the distinction between the Magnus lift force and vortex "lift force".

The VORF frequency measurement is enabled by employing a sensor that preferentially responds to motion parallel to cross member (50) as illustrated in FIG. 19. Magnet assemblies (114, 115) are similar to those depicted in FIG. 17 (i.e., 103, 104). However, the orientation of the permanent magnets relative to (50) is such that the electrical signal induced into solenoidal coil 120 is indicative of FSE motion induced substantially parallel to cross member (50), rather than perpendicular to (50) as in FIG. 17 required for determining mass flow. Similar considerations apply to the linear tuning fork configuration of FIG. 21a.

The shedding of vortices from the FSE exert temporary forces on the FSE causing the FSE to move and oscillate at a frequency substantially equal to VORF. VORF is substantially proportional to the flow velocity, V. That is, $$V \propto VORF \tag{29}$$

The frequency of the AC electrical signal (impressed across wires 120a and 120b), VORF, can be determined using frequency measuring circuits known to those of ordinary skill in the art. Accordingly, fluid density $\rho$ is determined from and is proportional to:

$$\rho \propto Q_M/VORF \tag{30}$$

Where the mass flow rate, $Q_M$, has already been determined using the Magnus effect in the present invention. Those of ordinary skill know that VORF may come substantially close to (or may equal) the resonant frequency of the "bluff body" (in this case the FSE) giving rise a phenomenon known as "lock in" (not to be confused with the lock-in amplifier used in this present invention in FIG. 16). Accordingly, it may be desired to design the static and dynamic characteristics of FSE assembly to have natural frequencies well separated from the range of VORF frequencies anticipated far a given fluid flow measurement application.

Viscosity Measurement & Compensation

The rotational friction experienced by the FSE as it executes rotational oscillation relates to fluid viscosity. Accordingly, a way to measure viscosity is to employ additional electronic circuit means to monitor and measure the electrical power supplied by the "drive" circuit excitation means supplying electrical excitation to sustain rotational oscillation. More precisely, the electrical power sustaining the rotational oscillation at given amplitude or rotational velocity relates to viscosity. The dampening of vibrations experienced by the FSE vibrating in a bending response mode (in response to the oscillating Magnus force), may have its dynamic amplitude influenced by viscosity variations, and thus may require compensative correction for viscosity or viscosity variations. Monitoring the "drive power", that is, the electrical power required to sustain rotational oscillation at given rotational amplitude or angular velocity provides the necessary information for making such a correction.

Monitoring the "drive power" required to sustain rotational oscillation provides built-in means for measuring viscosity using a common element (FSE) that also measures mass flow rate, flow velocity, and density. Alternatively, monitoring the "relaxation time" of the FSE response after temporarily interrupting oscillatory rotational excitation is yet another way to measure viscosity.

As the viscosity of a "clean" fluid varies directly with fluid temperature, a small compensative temperature correction can also account for systematic variations of viscosity with temperature.

Mechanical Amplification

The response amplitude of the FSE can be enhanced using "mechanical amplification": with suitable static/dynamic design, the applied rotational oscillation frequency can be brought closer the natural frequency of the FSE in its response mode. This permits the response amplitude of the FSE to be enhanced over that when the frequencies are well separated. The dynamical property of "mechanical amplification" is within the scope of the present invention and the amount of mechanical amplification employed is considered purely a matter of design choice.

Flow Velocity Profile Considerations

It is well known that fluids flowing through pipes exhibit a non-uniform flow velocity profile across the cross sectional area or the diameter of the pipe. The particular variation of flow velocity profile across a pipe depends, in part, on flow regime. Fluids in the laminar flow regime exhibit a parabolic flow velocity profile across the pipe, whereas in the turbulent flow regime, fluids exhibit a flatter or nearly "square" flow velocity profile. Flow velocity profile characteristics resulting solely from flow regime-related characteristics are usually symmetrical about the pipe centerline.

Additional variations or asymmetries to the flow velocity profile result from ancillary equipment or other intrusions in the pipe, which change the fluid flow pattern or impart "swirl". Depending on the type of flow measurement technology employed, variations in fluid flow velocity profile can contribute flow measurement errors.

Many volumetric flow instruments exhibit an unwanted sensitivity to flow velocity profile. Such instruments require considerable straight-runs of pipe upstream and downstream of the meter, on the order of 10 to 20 pipe diameters or more, in order to allow for a "well developed" flow velocity profile for measuring the fluid's flow rate.

Alternatively, additional in-line equipment such as "flow straighteners" may be employed to create a more uniform or repeatable flow velocity profile. Such straight runs of pipe or inclusion of "flow straightening" equipment may add to the cost and complexity of a flow sensor's installation. Additionally, some installations may not be able to physically accommodate such ancillary equipment.

The FSE or probe of the present invention has ability to average over the flow velocity profile because the probe extends across the pipe or conduit. The FSE effectively allows generation of Magnus-induced lift force at each location along each portion of the probe exposed to flowing fluid. Depending on local mass flow rate, the particular location on the probe where the fluid interacts, and the distance of that location from the support all result in exerting a given moment exerted on the FSE.

A way to be more independent or more immune to flow velocity non-uniformity is to allow the moments induced into the probe (and/or the resulting FSE response motion) to be substantially independent of the distribution of Magnus force exerted on the probe. One way this can be approached, in part, is to extend the length of the probe between the pipe and support compared with that portion of the probe exposed to fluid flow within the pipe. Alternatively, the shape of the probe can be tailored (e.g., as a tapered cone) so as to cause a given mass flow rate to exert substantially the same moment on the FSE regardless of the position along the probe's length where the particular fluid interaction occurs. Yet another alternative embodiment of the present invention involves attachment of the "free end" of the FSE, as described in previous embodiments, to the adjacent or opposite conduit wall directly or to a support by a suitably compliant mechanical connection.

Attachment of both FSE ends to a support removes "asymmetry" in the probe's response, thereby allowing the resulting probe configuration to be more tolerant of flow velocity profile variations as a result of being connected to a "support" at both distal ends.

What is claimed:

1. An apparatus for measuring the mass flow rate of fluid flowing in a conduit, comprising:
    probe means including a flow sensitive element for extension into a fluid flowing through a conduit;
    actuator means for imparting oscillatory rotary motion to said flow sensitive element about an axis transverse to the direction of flow of said fluid such that said flow sensitive element experiences an oscillatory Magnus lift force resulting in responsive oscillatory motion of said flow sensitive element in a direction normal to both said axis and said direction of flow; and
    sensor means for sensing said responsive oscillatory motion and operative to generate a response signal corresponding to the mass flow rate of said fluid.

2. An apparatus for measuring the mass flow rate of fluid flowing in a conduit as recited in claim 1, and further comprising:
    processor means responsive to said response signal and operative to provide an indication of said mass flow rate.

3. An apparatus for measuring the mass flow rate of fluid flowing in a conduit as recited in claim 2 and further comprising:
    support means adapted for sealing engagement to the exterior of a conduit about an opening formed therein and forming a housing for said actuator means, and wherein said probe means includes
        an elongated first cylindrical body extending through said opening and having a first distal end, and a first proximal end affixed to said support means, and
        an elongated second cylindrical body extending through said opening in a direction parallel to that of said first cylindrical body, said second cylindrical body having a second distal end, and a second proximal end affixed to said support means,
    a first elongated shaft extending coaxial with said first cylindrical body and having a first drive end affixed to said first distal end, and a first driven end,
    a second elongated shaft extending coaxial with said second cylindrical body and having a second drive end affixed to said second distal end, and a second driven end, and wherein said actuator means includes
        driver means coupled to said first driven end and said second driven end and operative to impart oscillatory counter rotational motion to said first cylindrical body and said second cylindrical body via said first and second shafts, and wherein said sensor means includes
            first motion detector means responsive to oscillatory motion of said first cylindrical body and operative to develop a first responsive signal, and
            second motion detector means responsive to oscillatory motion of said second cylindrical body and operative to develop a second responsive signal.

4. An apparatus for measuring the mass flow rate of fluid flowing in a conduit as recited in claim 3 wherein said processor means includes
    differencing means responsive to said first responsive signal and said second responsive signal and operative to generate a difference signal which is proportional to the difference therebetween,
    summing means responsive to said first responsive signal and said second responsive signal and operative to generate a sum signal which is proportional to the sum of said first responsive signal and said second responsive signal,
    integrating means for integrating said sum signal, and
    means responsive to the integrated sum signal and operative to develop a sum related signal which is proportional to the digitized root-mean-square (RMS), average or peak value of the integrated sum signal,
    means responsive to said difference signal and operative to develop a difference related signal which is proportional to the digitized RMS, average or peak value of the difference signal, and
    means for developing a mass flow rate signal which is proportional to said sum related signal divided by said difference related signal.

5. An apparatus for measuring the mass flow rate of fluid flowing in a conduit as recited in claim 3 wherein said processor means includes
    first means responsive to the first responsive signal and operative to develop a start signal, second means responsive to the second responsive signal and operative to develop a stop signal, counter means responsive to said start and stop signals and operative to develop a time difference signal, and electronic means responsive to said time difference signal and operative to generate an output proportional to the mass flow rate of material flowing through the conduit.

6. An apparatus for measuring the mass flow rate of fluid flowing in a conduit as recited in claim 3 wherein said processor means includes means for subtracting said first responsive signal from said second responsive signal to develop a difference signal, means for adding said first responsive signal and said second responsive signal to develop a sum signal, means for integrating said sum signal to develop an integrated sum signal, means for converting said difference signal to develop a square wave reference signal, lock-in amplifier means for demodulating said integrated sum signal using the square wave reference signal, means for converting the demodulated integrated sum signal and the difference signal to digital form, and electronic processing means for dividing the digitized demodulated integrated sum signal by the digitized difference signal to develop a flow rate signal which is proportional to the mass flow rate of fluid flowing through said conduit.

7. An apparatus for measuring the mass flow rate of fluid flowing in a conduit as recited in claim 2, and further comprising:

additional sensor means responsive to vibration of said flow sensitive element in the direction of fluid flow, due to vortex shedding, and operative to generate a vortex-induced frequency signal; and wherein said processor means is operative to use said vortex-induced frequency signal to develop a flow velocity signal, and is further operative to determine the density of the flowing fluid by dividing the measured mass flow rate by said flow velocity signal.

8. An apparatus for measuring the mass flow rate of fluid flowing in a conduit as recited in claim 1 and further comprising:

a support for attachment to the conduit through which said fluid is intended to flow, and wherein a proximal portion of said flow sensitive element is coupled to said support, and a distal portion of said flow sensitive element is affixed to said actuator means, said actuator means being operative to impart oscillatory rotary motion to said probe at said distal portion.

9. An apparatus for measuring the mass flow rate of fluid flowing in a conduit as recited in claim 8 wherein said flow sensitive element is in the form of an elongated cylinder having a proximal end affixed to said support and a distal end coupled to said actuator means.

10. An apparatus for measuring the mass flow rate of fluid flowing in a conduit as recited in claim 9 and further comprising shield means for shielding at least a portion of the surface of said flow sensitive element from direct fluid flow.

11. An apparatus for measuring the mass flow rate of fluid flowing in a conduit as recited in claim 10 wherein said shield means includes component parts both fore and aft of said flow sensitive element.

12. An apparatus for measuring the mass flow rate of fluid flowing in a conduit as recited in claim 9 wherein less than the entire outer surface of said flow sensitive element is exposed to direct fluid flow.

13. An apparatus for measuring the mass flow rate of fluid flowing in a conduit as recited in claim 9 wherein said support is adapted for sealing engagement to the exterior of a conduit about an opening formed therein, and said flow sensitive element is adapted for extension through said opening and into the flowing fluid.

14. An apparatus for measuring the mass flow rate of fluid flowing in a conduit as recited in claim 8 wherein said probe means includes an elongated first cylindrical body having a first distal end, and a first proximal end affixed to said support, and an elongated second cylindrical body disposed concentric with and exterior to said first cylindrical body, said second cylindrical body forming said flow sensitive element and having a second distal end, and a second proximal end affixed to said first cylindrical body proximate said first proximal end, and wherein said actuator means is disposed between said first distal end and said second distal end and is operative to impart oscillatory counter rotational motion to said first distal end and said second distal end.

15. An apparatus for measuring the mass flow rate of fluid flowing in a conduit as recited in claim 14 wherein said actuator means includes at least one electromagnetic driver, and wherein said sensor means includes at least one motion detector for detecting said responsive oscillatory motion.

16. An apparatus for measuring the mass flow rate of fluid flowing in a conduit as recited in claim 15 wherein said first and second cylindrical bodies include appendages extending transverse thereto and providing supporting platforms to which said electromagnetic driver and said motion detector are attached.

17. An apparatus for measuring the mass flow rate of fluid flowing in a conduit as recited in claim 16 wherein said actuator means includes a pair of electromagnetic drivers respectively disposed on opposite sides of said axis, and wherein said sensor means includes:

first motion detector means responsive to oscillatory motion of said first cylindrical body and operative to develop a first responsive signal, and second motion detector means responsive to oscillatory motion of said second cylindrical body and operative to develop a second responsive signal, said first and second motion detectors likewise being respectively disposed on opposite sides of said axis.

18. An apparatus for measuring the mass flow rate of fluid flowing in a conduit as recited in claim 17, wherein said sensor means includes an additional detector responsive to vibration of said flow sensitive element in the direction of fluid flow, due to vortex shedding, and operative to generate a vortex-induced frequency signal; and further comprising:

processor means responsive to the outputs of said motion detectors and operative to provide an indication of said mass flow rate, said processor means being further responsive to said additional detector and operative to use said vortex-induced frequency signal to develop a flow velocity signal, and being still further operative to determine the density of the flowing fluid by dividing the measured mass flow rate by said flow velocity signal.

19. An apparatus for measuring the mass flow rate of fluid flowing in a conduit as recited in claim 1 and further comprising:

a support for attachment to the conduit through which said fluid is intended to flow, said support being adapted for sealing engaging the exterior of a conduit about an opening formed therein, and wherein said probe means includes an elongated first cylindrical body having a first distal end, and a first proximal end affixed to said support, an elongated second cylindrical body disposed concentric with an exterior to said first cylindrical body, said second cylindrical body having a second distal end, and a second proximal end affixed to said first cylindrical body proximate said first proximal end, said flow sensitive element being attached to said second distal end and adapted for extension through said opening and into the flowing fluid, and wherein said actuator means is disposed between said first distal end and said second distal end and is operative to impart oscillatory counter rotational motion to said flow sensitive element via said second distal end.

20. An apparatus for measuring the mass flow rate of fluid flowing in a conduit as recited in claim 1 and further comprising:

support means adapted for sealing engagement to the exterior of a conduit about an opening in a wall of said conduit, said support means forming a part of a housing for at least one of said actuator means and said sensor means, and wherein said probe means includes an elongated first cylindrical body having a first distal end, and a first proximal end affixed to said support means, and an elongated second cylindrical body disposed concentric with and exterior to said first cylindrical body, said second cylindrical body forming said flow sensitive element and having a second distal end, and a second proximal end affixed to said support means, and wherein said actuator means includes driver means disposed between said first distal end and said second distal end and operative to impart oscillatory counter-rotational motion to said first distal end relative to that of said second distal end.

21. An apparatus for measuring the mass flow rate of fluid flowing in a conduit as recited in claim 1 and further comprising:

support means adapted for sealing engagement to the exterior of said conduit about an opening formed therein and forming a housing for said actuator means and said sensor means, and wherein said probe means includes an elongated first cylindrical body rotatable about a first axis and extending through said opening and having a first distal end, and a first proximal end affixed to said housing, a first elongated shaft extending coaxial with said first cylindrical body and having a first drive end affixed to said first distal end, and a first driven end, an elongated second cylindrical body rotatable about a second axis and disposed coaxial with and extending in a direction opposite to that of said first cylindrical body, said second cylindrical body having a second distal end, and a second proximal end affixed to said support, a second elongated shaft extending coaxial with said first elongated shaft and said second cylindrical body and having a second drive end affixed to said second distal end, and a second driven end, and said actuator means includes driver means coupled to said first driven end and said second driven end and operative to impart oscillatory counter-rotational motion to said first cylindrical body and said second cylindrical body via said first and second shafts.

22. An apparatus for measuring the mass flow rate of fluid flowing in a conduit as recited in claim 21 wherein said first cylindrical body forms said flow sensitive element.

23. An apparatus for measuring the mass flow rate of fluid flowing in a conduit as recited in claim 21 wherein said driver means is coupled to said first driven end and said second driven end by appendages extending transverse thereto and providing supporting platforms to which said electromagnetic actuators are attached.

24. An apparatus for measuring the mass flow rate of fluid flowing in a conduit as recited in claim 21 wherein said sensor means includes a pair of motion detectors for detecting said responsive oscillatory motion.

25. An apparatus for measuring the mass flow rate of fluid flowing in a conduit as recited in claim 21 wherein said sensor means includes first motion detector means responsive to oscillatory motion of said first cylindrical body and operative to develop a first responsive signal, and second motion detector means responsive to oscillatory motion of said second cylindrical body and operative to develop a second responsive signal.

26. An apparatus for measuring the mass flow rate of fluid flowing in a conduit as recited in claim 25 and further comprising processor means including differencing means responsive to said first responsive signal and said second responsive signal and operative to generate a digitized difference signal which is proportional to a digitized equivalent of the root-mean-square (RMS), average, or peak-value of the difference therebetween, summing means responsive to said first responsive signal and said second responsive signal and operative to generate a sum signal which is proportional to the sum of said first responsive signal and said second responsive signal, integrating means for integrating said sum signal and developing a digitized equivalent of the RMS, average, or peak-value of the integrated sum signal, and means responsive to the digitized equivalent of the integrated sum signal divided by the digitized equivalent of the difference signal to develop an output signal which is proportional to the mass flow rate of material flowing through the conduit.

27. An apparatus for measuring the mass flow rate of fluid flowing in a conduit as recited in claim 25 and further comprising processor means including:

first means responsive to the first responsive signal and operative to develop a start signal, second means responsive to the second responsive signal and operative to develop a stop signal, counter means responsive to said start and stop signals and operative to develop a time difference signal, and electronic means responsive to said time difference signal and operative to generate an output proportional to the mass flow rate of material flowing through the conduit.

28. An apparatus for measuring the mass flow rate of fluid flowing in a conduit as recited in claim 25 and further comprising processor means including:

means for subtracting said first responsive signal from said second responsive signal to develop a difference signal, means for converting said difference signal to a square wave reference signal, means for developing an RMS, average or peak value of said difference signal means for adding said first responsive signal and said second responsive signal to develop a sum signal, means for integrating said sum signal to develop an integrated sum signal, lock-in amplifier means for demodulating said integrated sum signal using said square wave reference signal as a reference to develop an RMS, average or peak value of said integrated sum signal, means for converting said RMS, average or peak value of said difference signal to a first digitalized equivalent thereof and for converting said RMS, average or peak value of said integrated sum signal to a second digitalized equivalent thereof, and electronic processing means for dividing said second digitalized equivalent by said first digitalized equivalent to develop a signal which is proportional to the mass flow rate of fluid flowing through said conduit.

29. An apparatus for measuring the mass flow rate of fluid flowing in a conduit as recited in claim 25, wherein said sensor means includes an additional detector responsive to vibration of said flow sensitive element in the direction of fluid flow, due to vortex shedding, and operative to generate a vortex-induced frequency signal; and wherein said electronic processing means is further responsive to said additional detector and operative to use said vortex-induced frequency signal to develop a flow velocity signal, and is still further operative to determine the density of the flowing fluid by dividing the measure mass flow rate by said flow velocity signal.

30. A process for measuring the mass flow rate of fluid flowing in a conduit, comprising the steps of:

exposing the flow sensitive element of a probe means to a fluid flowing through a conduit;

imparting oscillatory rotary motion to said flow sensitive element about an axis transverse to the direction of flow of said fluid such that said flow sensitive element experiences an oscillatory Magnus lift force resulting in responsive oscillatory motion of said flow sensitive element in a direction normal to both said axis and said direction of flow;

sensing said responsive oscillatory motion and generating a signal(s) commensurate with the mass flow rate of said flowing fluid; and electronically processing said signal(s) to provide an indication of said mass flow rate.

31. A process for measuring the mass flow rate of fluid flowing in a conduit as recited in claim 30 wherein a proximal portion of said flow sensitive element is affixed to a support, and said oscillatory rotary motion is applied to a distal portion of said flow sensitive element.

32. A process for measuring the mass flow rate of fluid flowing in a conduit as recited in claim 31 wherein said flow sensitive element is in the form of an elongated cylinder having a proximal end affixed to said support and a distal end affixed to an actuator means.

33. A process for measuring the mass flow rate of fluid flowing in a conduit as recited in claim 32 and further comprising the step of shielding at least a portion of the surface of said flow sensitive element from direct fluid flow.

34. A process for measuring the mass flow rate of fluid flowing in a conduit as recited in claim 33 wherein the step of shielding includes placing shield components both fore and aft of said flow sensitive element.

35. A process for measuring the mass flow rate of fluid flowing in a conduit as recited in claim 34, and further comprising the steps of:

sensing vibration of said flow sensitive element in the direction of fluid flow, due to vortex shedding, and generating a corresponding vortex-induced frequency signal;

using said vortex-induced frequency signal to develop a flow velocity signal; and determining the density of the flowing fluid by dividing the measured mass flow rate by said flow velocity signal.

36. A process for measuring the mass flow rate of fluid flowing in a conduit as recited in claim 32 wherein said support is sealingly engaged to the exterior of the conduit about an opening formed therein, and said flow sensitive element is extended through said opening and into the flowing fluid.

37. A process for measuring the mass flow rate of fluid flowing in a conduit as recited in claim 30 wherein less than the entire outer surface of said flow sensitive element is exposed to direct fluid flow.

38. A process for measuring the mass flow rate of fluid flowing in a conduit as recited in claim 30 wherein said probe means includes:

an elongated first cylindrical body forming said flow sensitive element is extended through said opening and is rotatable about a first axis, said first cylindrical body having a fist distal end, and a first proximal end affixed to said housing, a first elongated shaft extending coaxial with said first cylindrical body and having a first drive end affixed to said first distal end, and a first driven end, an elongated second cylindrical body rotatable about a second axis and disposed coaxial with and extending in a direction opposite to that of said first cylindrical body, said second cylindrical body having a second distal end, and a second proximal end affixed to said housing, and a second elongated shaft extending coaxial with said first elongated shaft and said second cylindrical body and having a second drive end affixed to said second distal end, and a second driven end, and wherein said oscillatory rotary motion is applied to said first cylindrical body by imparting oscillatory counter-rotational motion to said first cylindrical body and said second cylindrical body via said first and second shafts, and wherein said sensor means includes:

first motion detector means responsive to oscillatory motion of said first cylindrical body and operative to develop a first responsive signal, and second motion detector means responsive to oscillatory motion of said second cylindrical body and operative to develop a second responsive signal.

39. A process for measuring the mass flow rate of fluid flowing in a conduit as recited in claim 38 wherein said step of electronically processing said signals includes subtracting said first responsive signal from said second responsive signal to develop a digitized difference signal which is proportional to a digitized equivalent of the RMS, average, or peak-value of the difference therebetween, adding said first responsive signal and said second responsive signal to develop a sum signal which is proportional to the sum of said first responsive signal and said second responsive signal, integrating said sum signal and developing a digitized equivalent of the root-mean-square (RMS), average, or peak-value of the integrated sum signal, and dividing the digitized equivalent of the integrated sum signal by the digitized equivalent of the difference signal to develop an output signal which is proportional to the mass flow rate of material flowing through the conduit.

40. A process for measuring the mass flow rate of fluid flowing in a conduit as recited in claim 38 wherein said step of electronically processing said signals includes using said first responsive signal to develop a start signal, using said second responsive signal to develop a stop signal, using said start and stop signals to start and stop a counter to develop a time difference signal, and using said time difference signal to generate an electrical output proportional to the mass flow rate of the fluid flowing through the conduit.

41. A process for measuring the mass flow rate of fluid flowing in a conduit as recited in claim 38 wherein said step of electronically processing said signals includes subtracting said first responsive signal from said second responsive signal to develop a difference signal, adding said first responsive signal and said second responsive signal to develop a sum signal, integrating said sum signal to develop an integrated sum signal, converting said difference signal to develop a square wave reference signal, demodulating said integrated sum signal in a lock-in amplifier means using the square wave reference signal as a reference, converting the demodulated integrated sum signal and the difference signal to digital form, and dividing the digitized demodulated integrated sum signal by the digitized difference signal to develop a signal which is proportional to the mass flow rate of fluid flowing through said conduit.

42. A process for measuring the mass flow rate of fluid flowing in a conduit as recited in claim 38, and further comprising the steps of:

sensing vibration of said flow sensitive element in the direction of fluid flow, due to vortex shedding, and generating a corresponding vortex-induced frequency signal;

using said vortex-induced frequency signal to develop a flow velocity signal; and determining the density of the flowing fluid by dividing the measured mass flow rate by said flow velocity signal.

43. A process for measuring the mass flow rate of fluid flowing in a conduit as recited in claim 30, and further comprising the steps of:

sensing vibration of said flow sensitive element in the direction of fluid flow, due to vortex shedding, and generating a corresponding vortex-induced frequency signal;

using said vortex-induced frequency signal to develop a flow velocity signal; and determining the density of the flowing fluid by dividing the measured mass flow rate by said flow velocity signal.

44. A process for measuring the mass flow rate of fluid flowing in a conduit, as recited in claim 30 and further comprising the step of:

determining the viscosity of the flowing fluid by monitoring the drive power required to sustain said oscillatory rotary motion of said flow sensitive element at a particular rotational amplitude.

45. A process for measuring the mass flow rate of fluid flowing in a conduit, as recited in claim 30 and further comprising the step of:

determining the viscosity of the flowing fluid by monitoring the drive power required to sustain said oscillatory rotary motion of said flow sensitive element at a particular angular velocity.

46. An apparatus for measuring the mass flow rate of fluid flowing in a conduit, comprising:

probe means including a flow sensitive element for extension into a fluid flowing through a conduit;

actuator means for imparting oscillatory rotary motion to said flow sensitive element about an axis transverse to the direction of flow of said fluid such that said flow sensitive element experiences an oscillatory Magnus lift force in a direction normal to both said axis and said direction of flow; and sensor means for sensing said Magnus lift force and operative to generate a signal corresponding to the mass flow rate of said fluid.

* * * * *